United States Patent [19]
Shelton

[11] Patent Number: 5,568,385
[45] Date of Patent: Oct. 22, 1996

[54] SOFTWARE SYSTEM FOR COLLECTING AND DISPLAYING WEATHER INFORMATION

[76] Inventor: William A. Shelton, 3069 Myles Dr., Sparks, Nev. 89434

[21] Appl. No.: 251,983

[22] Filed: Jun. 1, 1994

[51] Int. Cl.⁶ .................................................. G06F 169/00
[52] U.S. Cl. ........................................................ 364/420
[58] Field of Search .................................. 364/420, 439, 364/456

[56] References Cited

U.S. PATENT DOCUMENTS

| | | | |
|---|---|---|---|
| 4,521,857 | 6/1985 | Reynolds, III | 364/439 |
| 4,706,198 | 11/1987 | Thurman | 364/439 |
| 5,023,934 | 6/1991 | Wheeless | 455/45 |

*Primary Examiner*—Donald E. McElheny, Jr.
*Attorney, Agent, or Firm*—Townsend and Townsend and Crew, LLP

[57] ABSTRACT

A computer-based system for collecting and displaying weather information includes a microprocessor-based computer programmed to receive digital signals encoding weather data collected at each weather station; and to store and retrieve those digital signals in predetermined screen buffers to generate weather data screens displaying alphanumeric and graphic displays of weather data. The system further includes multiple weather stations, each comprised of one or more weather instruments, each capable of sensing a particular weather parameter and converting that parameter into a analog electrical signal, with means for converting the analog signal into a series of digital signals corresponding to the values of the weather parameter over time. The system further including means for communicating the digital signals from the weather stations to the computer and means for displaying the data screens to multiple end users in real time. Remote weather stations are connected to the computer by conventional modem/telephone hookups. Display screen data output from the computer is converted to a television broadcast quality signal so that the data screens may be broadcast or otherwise delivered to television viewers through conventional television delivery systems.

10 Claims, 19 Drawing Sheets

```
TAHOE CITY  409        03:47:21 PM

TEMPERATURE  45    WIND CHILL  35

HUMIDITY     10

BAROMETER    29.45

WINDS        NNE AT 5 MPH
PEAK GUST    NE 35 MPH AT 2:10 P.M.
```

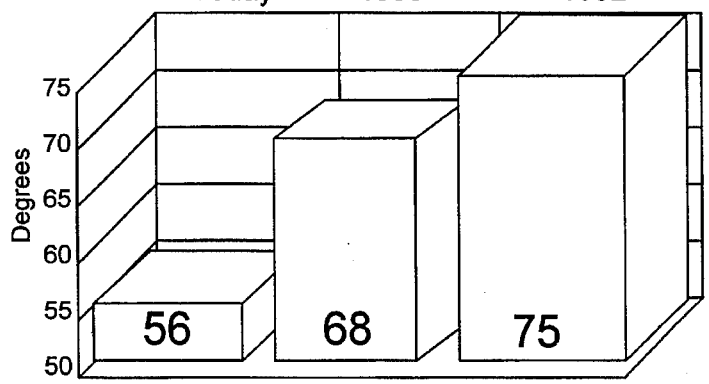
*FIG. 7B*
South Tahoe High    11:39:56 AM
|  | Temp | Winds |
|---|---|---|
| Heavenly | 56 | Calm |
| Mt. Rose | 40 | Calm |
| Remote Site 3 | 0 | Calm |
| Squaw Valley | 16 | NE at 14 mph |
| Homewood | 45 | N at 15 mph |
*FIG. 7C*
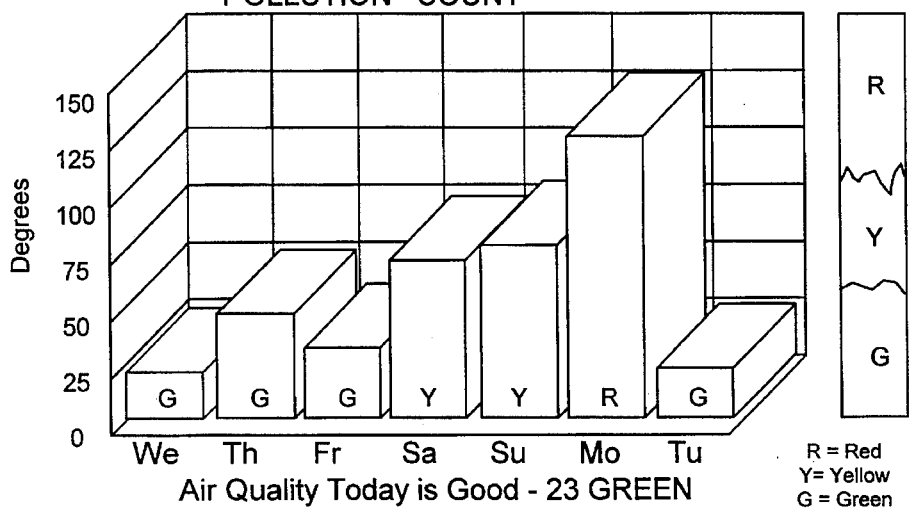
*FIG. 7D*

South Tahoe High    12:41:37 PM
ROAD CONDITIONS

| Donner Pass | Chains or Snow Tires |
| Mt. Rose Hwy. | Chains or Snow Tires |
| SR 267 | Chains or Snow Tires |
| US 50 West | Chains or Snow Tires |

Set Temperatures

Temperatures From 12am To 8am

| | | |
|---|---|---|
| 12:00 am | 39 | 5:00 am 34 |
| 246 1:00 am | 40 | 6:00 am 33 |
| 2:00 am | 38 | 7:00 am 33 |
| 3:00 am | 37 | 8:00 am 38 |
| 4:00 am | 35 | |

Temperatures From 9am To 5pm

248
- 9:00 am 46      2:00 pm 0
- 10:00 am 51    3:00 pm 0
- 11:00 am 53    4:00 pm 0
- 12:00 am 0      5:00 pm 0
- 1:00 pm 0

Temperatures From 4pm to 11pm

250
- 4:00 pm 0      9:00 pm 0
- 5:00 pm 0      10:00 pm 0
- 6:00 pm 0      11:00 pm 0
- 7:00 pm 0
- 8:00 pm 0

Main Screen Colors   252
- Background Color
- HighLight Color
- Shadow Color
- Label Color

Chart Type   254
13 - Tape

Chart Colors   256
- Background Color
- Line Color

Get Data — 258

Exit — 260

Temperatures From 12am To 8am

- 12:00 am 39    5:00 am 34
- 1:00 am 40      6:00 am 33
- 2:00 am 38      7:00 am 33
- 3:00 am 37      8:00 am 38
- 4:00 am 35

Main Screen Colors
- Background Color
- HighLight Color
- Shadow Color
- Label Color

Select Which Site

| 1 | 2 | 3 | 4 | 5 | 6 | 7 | 8 |

Cancel       262

- 4:00 pm 0      9:00 pm 0
- 5:00 pm 0      10:00 pm 0
- 6:00 pm 0      11:00 pm 0
- 7:00 pm 0
- 8:00 pm 0

Get Data

Exit

*FIG. 16*

Configuration for Data Line #1

Select A Line To Configure
314

Communications Port Setup
- ● Use modem to connect    315
- ○ Connect direct to Davis
- ○ Allow Dial In From Another PC Send Data From Line

- ● Auto Startup    316

Modem Configuration
321
Default Phone # for Auto Start

Set Phone # From Dialer

Modem Init Dial String

ATQ0V1E1S0=0

Modem Dial Timeout (secs)

40

Data Logging
- ● Write Data To Log    324
- ○ Never Erase
- ○ Erase Every Day
- ○ Erase Every Week
- ● Erase Every Month
- ○ Erase Every Year Update Log Every 60    Seconds

Weather Instrument Setup
318
Barometer Adjustment
29.79

Rain Measurement
- ● Rain Measured in 1/100 in.
- ○ Rain Measured in 1/10 in.    320

Serial Port Settings    322
- ○ 1200 Baud
- ● 2400 Baud

Comm Port

Port 2

Snow Sensor    326
● Snow Sensor Enabled

Port

[Reset]    [Save]    [Exit]

Note: Please Use Line 1 For the local site if possible. This will allow others dial in access to the same data.

*FIG. 24*

SOFTWARE SYSTEM FOR COLLECTING AND DISPLAYING WEATHER INFORMATION

BACKGROUND OF THE INVENTION

The present invention relates generally to weather detection and reporting; and more particularly to a computerized system for detecting weather information at multiple sites, and for communicating that information to multiple end users.

The National Weather Service maintains a network of radar installations in the United States. Based upon information gleaned from the radar, observers at these stations provide hourly teletyped messages which are disseminated to subscribers.

In addition, the National Weather Service employs Weather Bureau Radar Remote (WBRR) equipment designed to provide annotated plan position indicator display at locations remote from the radar sites. Here, a camera scans a high persistency slave display of the radar picture at a slow rate so that the generated information bits can be transmitted over the telephone lines. With this system, it is possible to dial up any one of the remote sites and obtain a transmission of the radar picture information from the remote site. More complete information concerning the National Weather Service system is available in a publication entitled "Introduction to Weather Radar" published in August 1979 by the U.S. Department of Commerce, National Oceanic and Atmospheric Administration.

More detailed weather information can be obtained from the WBRR radar with the National Weather Service Digital Video Integrator and Processor (D-VIP), which automatically processes the output of the radar to produce up to six levels of intensity data corresponding to preselected categories of estimated rainfall rates which, in turn, may be displayed and disseminated as described above.

Improvements on the WBRR system are disclosed in U.S. Pat. No. 4,347,618, "Apparatus For Processing Weather Radar Information", Aug. 31, 1982 to Kavouras et al., where a transmitter adapted to receive radar data from the National Weather Service radar network is used to process the data into a four-range radar image and to append geographical overlay information for transmission over voice grade phone lines to remote receivers. In the receivers, the data from the phone lines is demodulated and stored into predetermined memory locations corresponding to the four range categories from which the radar data had originally been acquired. Once stored, the individual ranges can be individually selected for display in a six color format representing the six levels of D-VIP intensity data.

The foregoing systems collect essentially only a single weather parameter, namely precipitation. In addition, there is considerable delay between the time the system commences collecting data, and the time that data is displayed to the end user.

Other weather data detection and display systems employ multiple weather data sensors including an anemometer, temperature sensor, rain collector, and/or humidity sensor to detect multiple weather parameters. In a basic system, the weather sensors are connected to a display box containing an analog to digital converter. The display box receives analog weather data from the weather sensors and displays current numerical readings of the data in digital format. In an expanded system, the display box is coupled to an interface modem containing dynamic random access memory (RAM). The interface modem is coupled to a microprocessor based computer programmed to display graphical readings of the data. In this expanded system, incoming weather data is automatically stored in RAM. The system includes sufficient RAM to store approximately 24 hours worth of data. Once all memory is consumed, new data displaces old data. To collect continuous weather data for multiple days, the operator manually downloads weather data from the interface modem to the computer hard disk on a daily basis. One supplier of such systems is Davis Instruments Corp. of Hayward, Calif., which offers Weather Monitor II ™ display box, and Weatherlink ™ interface modem and software.

SUMMARY OF THE INVENTION

The present invention is a system which includes multiple weather stations, for collecting multiple weather parameters; a central ("base") microprocessor-based computer programmed with Windows-based (or other like operating system suitable for running multiple files simultaneously), to collect weather data from the multiple weather stations, automatically manipulate that data into informational subsets for display in graphic format; and means for transmitting that data to end users.

Each weather station normally includes some or all of the following instruments for sensing different weather parameters and the like: thermometer, humidity gauge, barometer, anemometer, rain gauge, water temperature sensor, snow depth gauge, cloud scanner, earthquake sensor, video camera. Each weather station will normally include one or more analog to digital converters to convert the normally analog signals from the weather sensors into digital signals capable of being stored and manipulated by the base computer.

Often one of the weather stations in each system will be connected directly to the base computer, to measure weather conditions at the base, whereas the other weather stations will be positioned at locations remote from the base computer. The remote weather stations communicate with the base computer via voice quality telephone lines, either permanently open telephone line or a dial up line. Data is stored on a minute-by-minute basis for the entire period during which communication from the base to the remote weather station occurs. If a remote site has a computer, it will download its datafiles for any time period (such as hour, day, etc.) requested by the base site via phone line/modem. Data can then be processed by computer at basesite.

It is not necessary, however, to maintain a computer at each location just to maintain historical data. This is automatically accomplished by the base computer as the remote site sends in its readings. There will be a data entry for each minute as long as the phone line is maintained. The remote computer can also perform other important functions, such as storing and disseminating the rate of snowfall per hour, total snowfall per hour, day, year; snowfall intensity (light, moderate, heavy) moisture content per inch of snow, and snowfall totals compared to seasonal norms for any given location.

The remote location computer also enables multiple users from a variety of locations to access and view the stored and real-time data at the site. Multiple users can view different pieces of information without conflict from each user. This data can be distributed in broadcast format, or as VGA signal into other computers. During the period of time the users are "on-line" the data stream into the remote location computer remains uninterrupted, as well as any other base locations.

Computer on-site also allows from the data to be given in direct audio format (language) by use of computer-generated voice-files. Multiple users can hear the elements as well as see them.

Although voice quality telephone transmission is the preferred means for communicating weather data from remote weather stations to the base computer, other means can be employed including cellular, short wave, wireless, broadcast radio, etc.

The base computer communicates weather information to end user in a variety of ways, including by television broadcast or cable; or by a network server (like Compuserve, or the like); or displayed over multiple video source units. Real time communication between the base computer and television broadcast transmitter and/or network server may be by coaxial cable hookup, microwave, or any other system suitable for carrying graphic data signals.

Where the signal from the base computer is intended for broadcast or multiple video source distribution, the signal is modified to meet NTSC standards for broadcast quality viewing.

The system includes the ability to collect numerical, textual data, graphs, and pictures; to superimpose the numerical, textual and graph data on said pictures; and to communicate the superimposed image to end users. In this case, pictures can be stored images or real time images being collected with a video camera at the same time as the weather data is being collected. In this fashion, the system is capable of providing end users with high information content weather images, for example, temperature, rainfall, wind speed and barometric data (in alphanumeric and/or graph expression) superimposed upon a satellite picture of the region in question, or some other picture of interest (e.g., real time or taped video of the rain falling; wind blowing snow, rain or trees; snow drifts; snow control teams in action; hurricanes; tornados; earthquakes; etc.)

An advantage of the present invention is thus that it can collect weather data from multiple weather parameters at multiple weather stations; communicate that data to a central processor; automatically process that data into predetermined graphic informational subsets; and communicate that graphic information in said subsets to end users, all in real time.

A further advantage is that the present invention can communicate such graphic information to end users via a variety of techniques including by television broadcast, coaxial cable, network server, multiple source video units.

Still another advantage is that extremely high information content images can be collected and communicated to end users in real time, from multiple weather sites.

Another advantage is that because the base computer is programmed with Windows-based (or the like) software, multiple files can be running simultaneously on the base computer. In practice, this means that the system can be used in a live television weather broadcast where the broadcast can be switched from screen to screen without interruption, where each screen is the output of a separate file. Thus, the broadcast can display sequential real time weather data screens from different weather sites around the viewing area. For example, a weather broadcast in Reno could show—in rapid, real time sequence—weather data such as temperature, rainfall, snowfall and windspeed—from Reno, Incline Village, Donner Pass, Mount Rose, and Lake Tahoe. Since each of these sites has its own weather system, real time weather data from such sites are important to many persons in the Reno viewing area including motorists skiers windsurfers hikers fishermen, and persons engaging in various other endeavors.

BRIEF DESCRIPTION OF THE DRAWINGS

FIG. 1 illustrates a system wherein one weather station is local to the base computer, and the remaining weather stations are remote so that the base computer accesses them through voice quality telephone lines and a modem.

FIG. 7B is a sample screen illustrating data obtained by clicking on the "Today's High Temperatures" button in panel of FIG. 6.

FIG. 7C depicts a sample of weather data such as might appear by clicking on the "[1–5] Remote Conds-pg 1" button in panel 208 of the screen depicted in FIG. 6.

FIG. 7D is an example of the screen displayed by clicking on the button "Pollution Count" in Panel 208 of FIG. 6.

FIG. 15 illustrates the control screen for the Temperature Progression category of the Modify Looks menu 212 in FIG. 10.

FIG. 16 illustrates the Set Temperatures control screen of FIG. 15 with the pop-up control panel 62 displayed.

FIG. 24 shows the Configuration for Data screen which appears by clicking on the phone symbol 309 in FIG. 23.

DESCRIPTION OF THE PREFERRED EMBODIMENT

Figure 1:
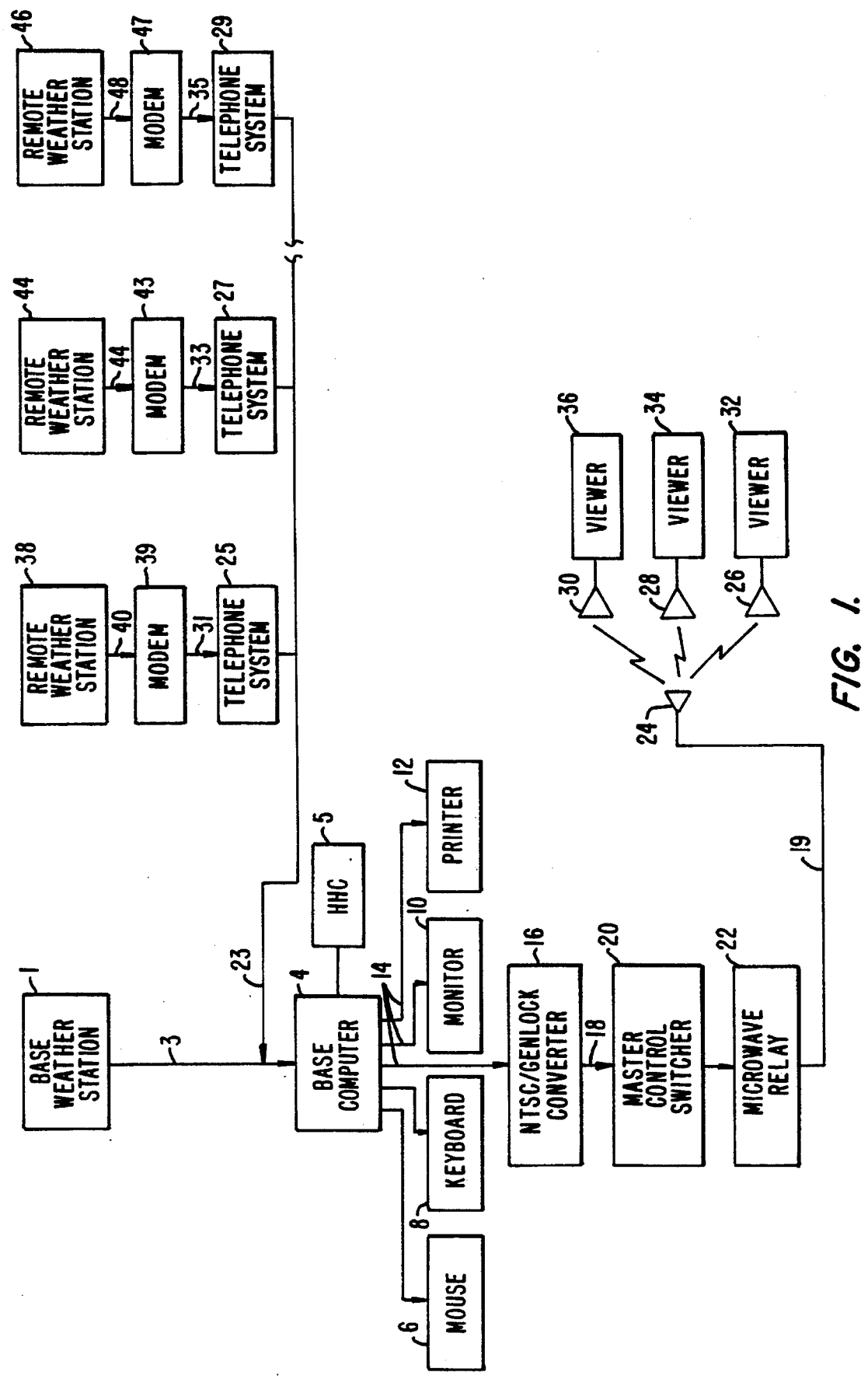
FIG. 1 is a schematic diagram of a computer-based multi-station weather data collecting and reporting system according to the present invention, wherein there are multiple weather stations collecting and reporting weather data to a base computer. The computer outputs weather data signal to signal processing equipment which convert such signal to broadcast ready status, by converting the VGA image into a genlocked, NTSC video source, whereupon the processed signal is sent to a television broadcast transmitter via microwave relay apparatus and, ultimately, broadcast to the public.

FIG. 1 is a schematic diagram of a computer-based multi-station weather data collecting and reporting system according to the present invention. Each weather station 1, 38, 42, 46 includes a number of different weather sensing instruments. As will be explained in greater detail with reference to FIG. 2, the weather sensing instruments included in each weather station 1, 38, 42, 46 can detect a variety of different weather parameters such as, for example, rainfall, temperature, barometric pressure, humidity, wind speed, and the like. The specific weather data that can be sensed by any given weather station, e.g. Base Weather Station 1, depends upon what weather sensing instruments are installed at that particular station 1. The selection of which weather instruments to employ at any given weather station is a matter of choice to be determined by the user. The Weather Stations need not each have the same weather instruments, and normally different combinations of instruments will be used at different weather stations. For example, the weather station at a mountain top might include, among other things, an instrument to measure snow depth, but have no need for an instrument to detect water temperature. Conversely, a weather station located at sea level lake might have no need for an instrument to measure snow depth, but might include, among other things, an instrument to measure water temperature.

Each weather station 1, 38, 42, 46 generates a continuous stream of encoded serial digital signals 3, 40, 44, 48. Each separate encoded serial digital signal contains the weather data collected from each weather instrument at a particular instant in time, with successive signals carrying such weather data collected at successive instants in time.

Base computer 4 is located at or near the Base Weather Station 1. Normally, the base computer 4 is located in a building or shelter of some sort, whereas the Base Weather Station is located nearby, but out of doors, e.g. on the roof of the structure housing the base computer. Thus, the output signal 3 of Base Weather Station 1 may be connected directly to the serial port of the base computer 4, e.g., six or four-pin telephone wire.

Remote Weather Stations 38, 42, 46 are positioned at locations remote from base computer 4. Whereas Base Weather Station 1 can communicate with base computer 4 via coaxial cable or other direct hookup, Remote Weather Stations 38, 42, 46 normally must communicate with the base computer 4 by other means such as, for example, via modems 39, 43, 47 and voice grade telephone systems 25, 27, 29. The signal 23 received at the base computer 4 from Remote Weather Stations 38, 42, 46 is taken in via the modem (not shown) of the base computer 4 before joining the signal 3 from Base Weather Station 1 for processing by the base computer. This connection through the modem is important because the software allows for data flow to continue even after power is lost temporarily at remote computer. Following outage the remote station immediately directs signal into phone line and into base (waits for base station to resume flow through software). The digital signal from each weather station 1, 38, 42, 46 is sent along particular telephone line chosen by the user. The data signal continues as long as communication (through phoneline) is maintained. Data can be loaded in "bunches" if done so in a network situation.

The base computer 4 is provided with conventional peripheral I/O devices, including a mouse 6, keyboard 8, monitor 10 and printer 12. In addition, the computer 4 is provided with a hand held controller 5 which combines the necessary functions of the mouse and keyboard into a single hand held unit, coupled to the computer directly by a cable or indirectly by infrared wireless hookup. The HHC 5 includes a keypad which allows random access to the screens shown in window 208, as described below.

The function keys of keyboard 8 are programmed to preview the data screens of windows 207 and 208.

The printer 12 is used to provide hard copy of the Data Viewer data (FIG. 22), for archive purposes or to prepare graphs in Excel or other similar software.

The base computer 4 is programmed with Windows-based software (or other like software suitable for running multiple files simultaneously) to collect digital weather data signals 3, 23 from the weather stations 1, 38, 42, 46, determine which weather station each signal is from, decode the encoded digital weather information from each weather instrument at each weather station 1, 38, 42, 46, automatically manipulate that data into multiple informational subsets or files for display in graphic format. The base computer 4 is thus programmed to run multiple files simultaneously, with one or all or some intermediate portion of the multiple files displayed simultaneously on the monitor 10 with each file allocated to a separate portion of the screen, while the remaining files run in the background, ready to be instantaneously called to the foreground for viewing. Each file consists of some subset of the weather information collected by the computer, e.g. one file might contain the rainfall, temperature and windspeed at Donner Pass in the Sierra Mountains; and another file might contain the rainfall, temperature, windspeed, humidity and water temperature of a location 40 miles away at Lake Tahoe in Tahoe City, Calif.

The base computer 4 sends the output signal 14, corresponding to screen display data, to the monitor 10, and also to a conventional NTSC/Genlock signal processor 16 which converts the screen display signal 14 into a television broadcast quality video signal 18 in a conventional manner. Video signal 18 is then routed through conventional television broadcast equipment to the end users, i.e. to television viewers. Thus, for example, the video signal 18 from the NTSC/Genlock signal processor 16 goes to a master control switcher 20 which accepts video signals from various other sources (not shown) and selects which of said signals 19 will be broadcast to viewers at any given instant. The selected signal 19 goes to a microwave relay tower 22, which relays the selected signal 19 to a television broadcast antenna 24, for broadcast to reception antennas 26, 28, 30 of viewers 32, 34, 36. Thus, the image transmitted to the viewers 32, 34, 36 at any given instant is the image appearing on the base computer monitor 10.

Figure 2:
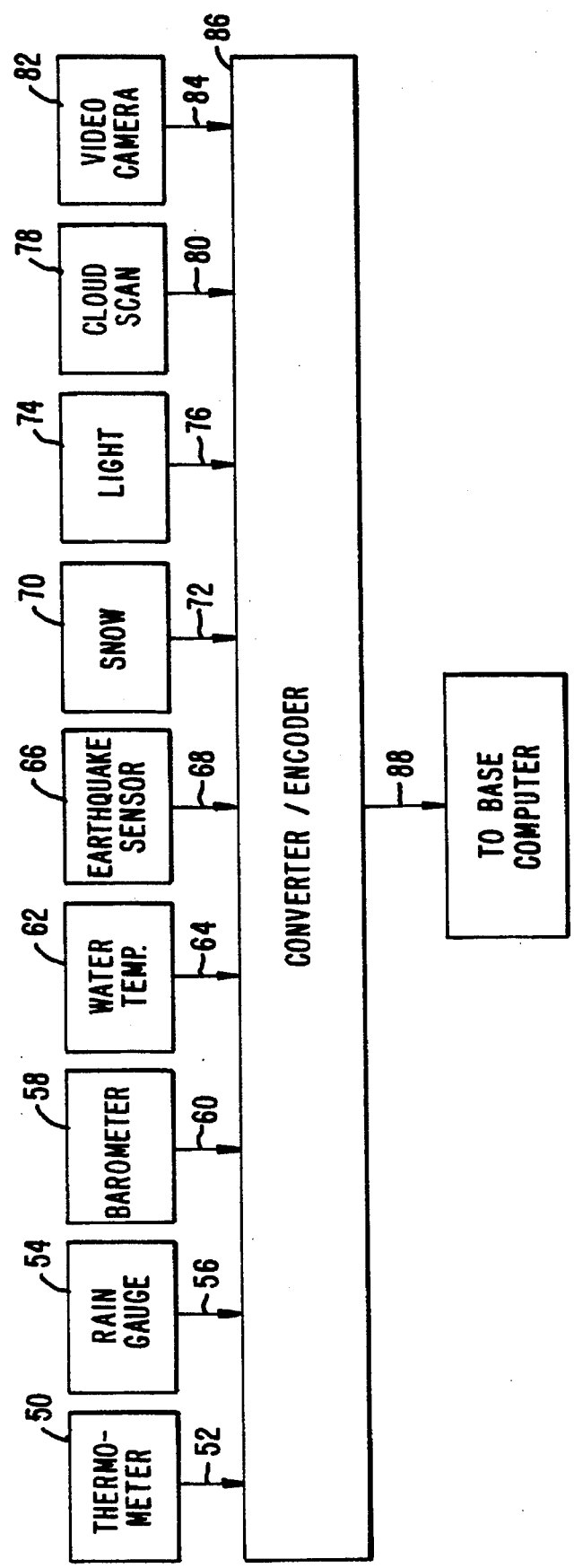
FIG. 2 is a weather station of the type shown at FIG. 1, illustrating various weather sensing instruments suited for use in such a weather station.

FIG. 2 is a weather station of the type shown in FIG. 1. FIG. 2 illustrates various weather sensing instruments suited for use in such weather stations. The station is comprised of a series of different weather sensing instruments such as a thermometer 50, rain gauge 54, barometer 58, water temperature gauge 62, earthquake sensor 66, snow depth gauge 70, light meter 74, cloud scanner 78, and video camera 82. Each weather instrument is electronic i.e. it is designed to generate an electrical signal that varies in an analog fashion according to variations in the weather parameter being sensed by the instrument. Thus, for example, the thermometer 50 generates a relatively low voltage electrical signal 52 when the ambient temperature is 40 degrees Fahrenheit, and a relatively higher voltage signal 52 when the temperature is 50 degrees fahrenheit. The analog electrical signals 52, 56, 60, 64, 68, 72, 76, 80, 84 from each of the weather instruments 50, 54, 58, 62, 66, 70, 74, 78, 82, respectively, each represent a particular value of each weather parameter measured by the instruments.

The analog signals 52, 56, 60, 64, 68, 72, 76, 80, 84 go to converter/encoder 86 which converts each analog signal to a parallel digital signal, converts each parallel digital signal to a corresponding serial digital signal, and then encodes all such serial digital signals corresponding to the weather data collected at that weather station at a particular instant, into a single serial digital signal 88. For example, an encoded serial digital signal 88 is a fixed length string of 18 bytes. The first byte is a header, the next two bytes are water temperature, the next two bytes are ambient air temperature, the next byte is windspeed, the next two bytes are wind direction, the next two bytes are barometric pressure, the next byte is humidity, the next byte is light level, the next four bytes are rainfall, the last two bytes are the check to be sure the string came across properly. Thus, the position of each byte within the string indicates the specific weather parameter to which that byte corresponds. If the weather station is sampling at the rate of one reading every minute, then the first 18 byte string corresponds to the data collected by all instruments at minute one, the next 18 bytes corresponds to the data collected by all instruments at minute two, and so forth.

The output signal 88 of the converter/encoder 86 is sent to the base computer via coaxial cable (as signal 3 of FIG. 1), via modem/telephone communications system (as signal 23 of FIG. 1), or by any other suitable means of communication.

A simplified form of weather station of the type shown in FIG. 2 may be purchased from Davis Instruments Corp. of Hayward, Calif., which offers Weather Monitor II ™ display box, Weatherlink ™interface modem and software. The Davis system is designed to work with an anemometer, external temperature sensor, external temperature/humidity sensor, and rain collector. The Davis display box takes analog signals from the instruments, converts the analog signals to parallel digital signals, stores the digital signals, displays the digital signals with a digital readout device, calculates the wind chill factor from external temperature and windspeed data, records the time and magnitude of peak wind gusts, records the time and magnitude of high and low temperature. The Davis interface modem stores up to 24 hours of data in RAM, converts the parallel digital signal to an encoded serial digital signal of the type described above, for transmission to the serial port of a base computer. A base computer is programmed with the Davis software, which must then be manually instructed to download weather data from the interface modem RAM. Unlike the present invention, the Davis system is not designed to run multiple weather stations from a base computer, nor is the base computer programmed to run multiple screens simultaneously or multiple sites on the sane screen at the same time. Nonetheless, the Davis weather station can be modified to be used in the present invention.

According to the present invention, the system of FIG. 1 can run up to eight weather stations, sending data from all eight weather stations to the base computer 4 simultaneously and continuously. The conventional personal computer utilized in the system of the present invention was originally configured with four comports. These original four comports were expanded to eight comports with a system sold under the trademark "T Port Twin".

Figures 3, 7A:
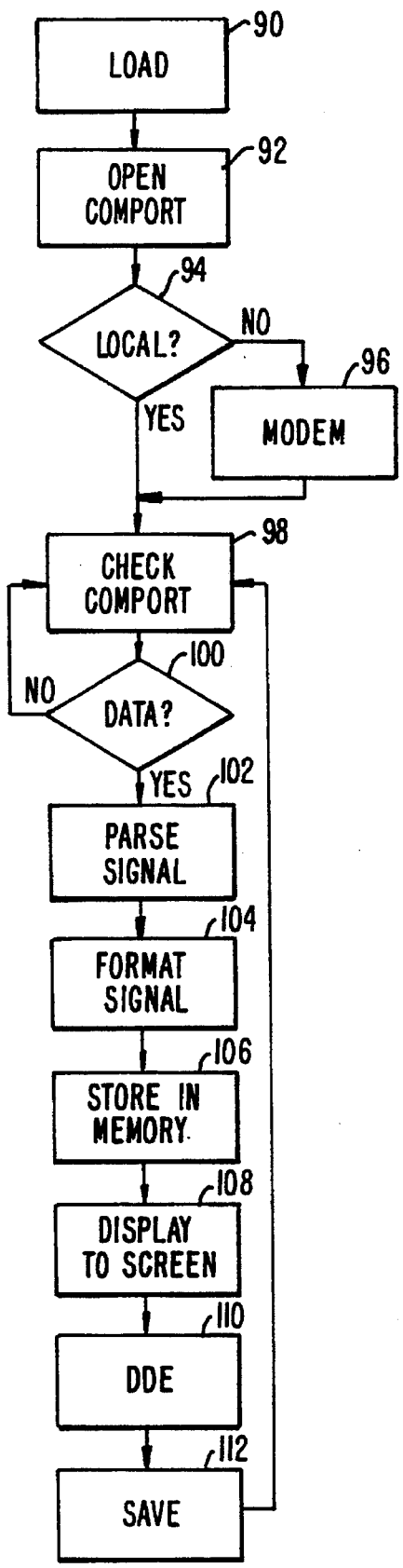
FIG. 3 is a flow chart of the logic operations for handling data received from a weather station.
FIG. 7A is an example of how the default screen for the Remote Conditions button in the screen of FIG. 6 might appear.

FIG. 3 is a flow chart of the logic operations for handling data received from a weather station. Weather station serial data enters the serial port of the base computer 4 (LOAD 90). The comport assigned to that particular weather station opens (OPEN COMPORT 92). If the signal is not LOCAL 94—i.e. if the signal comes via modem/telephone, rather than from a local source—the signal is sent through the MODEM 96 for demodulation. If the signal is LOCAL 94, or if it has been demodulated, the system checks the comport to see if it contains data (CHECK COMPORT 98). If there is not DATA 100, then the system delays one half second and checks again. This loop is repeated until there is DATA 100 in the comport, whereupon the system parses the signal into its component parts (PARSE SIGNAL 102). In other words, where the serial digital signal is an 18 byte string, in the example described above, the system sorts it out into its components, e.g. into water temperature, ambient air temperature, windspeed, wind direction, barometric pressure, humidity, light level, and rainfall, with the particular parameter being identified by its position in the string. Each parsed signal segments (corresponding to a particular weather parameter) is then formatted (FORMAT SIGNAL 104) into integers (two bytes) or longs (4 bytes, for decimal notation). The formatted data is then stored in memory (STORE IN MEMORY 106), and displayed on the screen of the monitor 10 (DISPLAY TO SCREEN 108). The data is also then run through the dynamic data exchange (DDE 110) protocol, to exchange the data with any other programs linked to it. The system is set to save the data to the hard drive or other storage device at predetermined intervals, e.g. every thirty seconds (SAVE 112). Having completed the foregoing, the system loops back (e.g. every one-half second) to once again check the comport for data (CHECK COMPORT 98). The subroutine proceeds from that point forward as already described.

Figure 4:
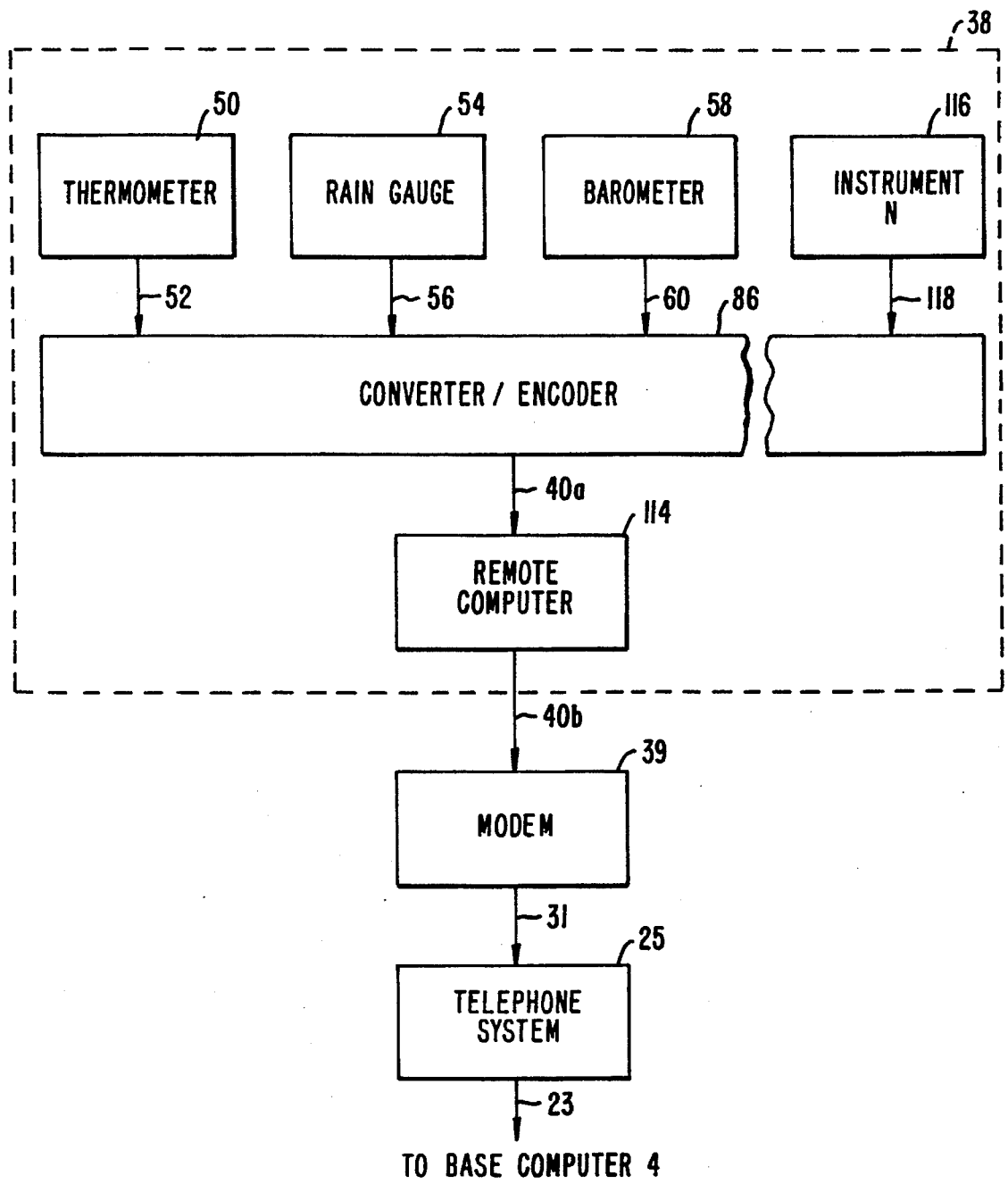
FIG. 4 is a schematic diagram of an alternate embodiment of the data collecting portion of a single remote weather station in the computer-based multi-station weather data collecting and reporting system of FIG. 1, where the remote weather station is provided with its own microprocessor based computer to collect weather data prior to downloading to the base computer, and perform other desired functions as noted earlier.

FIG. 4 is a schematic diagram of an alternate embodiment of the data collecting portion of a single remote weather station 38 in the computer-based multi-station weather data collecting and reporting system of FIG. 1, where the remote weather station 38 is provided with its own microprocessor based computer (REMOTE COMPUTER 114) to collect weather data prior to downloading to the base computer, and perform other desired functions. In FIG. 4, weather instruments 50, 54, 58, . . . 116 (INSTRUMENT N) of remote weather station 38 send analog signals 52, 56, 60, . . . 118 to the converter/encoder 86 which converts each time batch of analog signals to a single serial data signal, encoding the weather data from the instruments 50, 54, 58, . . . 116 as described in connection with FIG. 2. Serial weather data signals 40 are sent to the remote computer 114, where they may be stored for later retrieval. An advantage of this arrangement is that the telephone line between the remote weather station 38 and the base computer 4 need not be dedicated to the system and kept open continuously. Instead, the said telephone line is normally closed, and while said line is closed, weather data signals 40a are stored in the remote computer 114. In this arrangement, the telephone line need be opened only periodically during which time all data from the remote weather station 38 can be rapidly downloaded to a storage device in the base computer 4, after passing through the processing steps described in connection with FIG. 3. Thus, the telephone line between the remote weather station 38 and the base computer 4 may be a standard non-dedicated telephone line, or a dedicated line that is kept closed except at moments when downloading occurs. The base computer 4 can be programmed to automatically telephone the remote computer 114 at regular intervals, for automatic regular downloading of data from the remote computer to the base computer.

Another advantage of the system of FIG. 4 is that the base computer can be programmed to detect the loss of a telephone connection between the base computer 4 and remote weather station. When power is restored at the remote site, the telephone connection between base and remote computer remains open. Thus, although no data flows from the remote site while remote site power is off, data can resume flowing as soon as remote power is restored when the system is configured to permit it, i.e., with reference to FIG. 24, when buttons 315 and 316 are toggled to "Allow Dial In From Another PC" and "Autostartup," respectively. In this configuration, when remote power is restored, data flow is automatically resumed.

Another advantage is that the remote computer 114 can be programmed to manipulate weather data at the remote site without interrupting the flow of data to the base computer. Still another advantage is that more sophisticated and complex weather instruments can be used at the remote site which themselves are under computer control i.e. under control of the remote computer 114. Another advantage is that users at remote location (schools, etc.) can navigate through the remote station data at the same time without conflicting with the base user or multiple users.

Figure 5A:
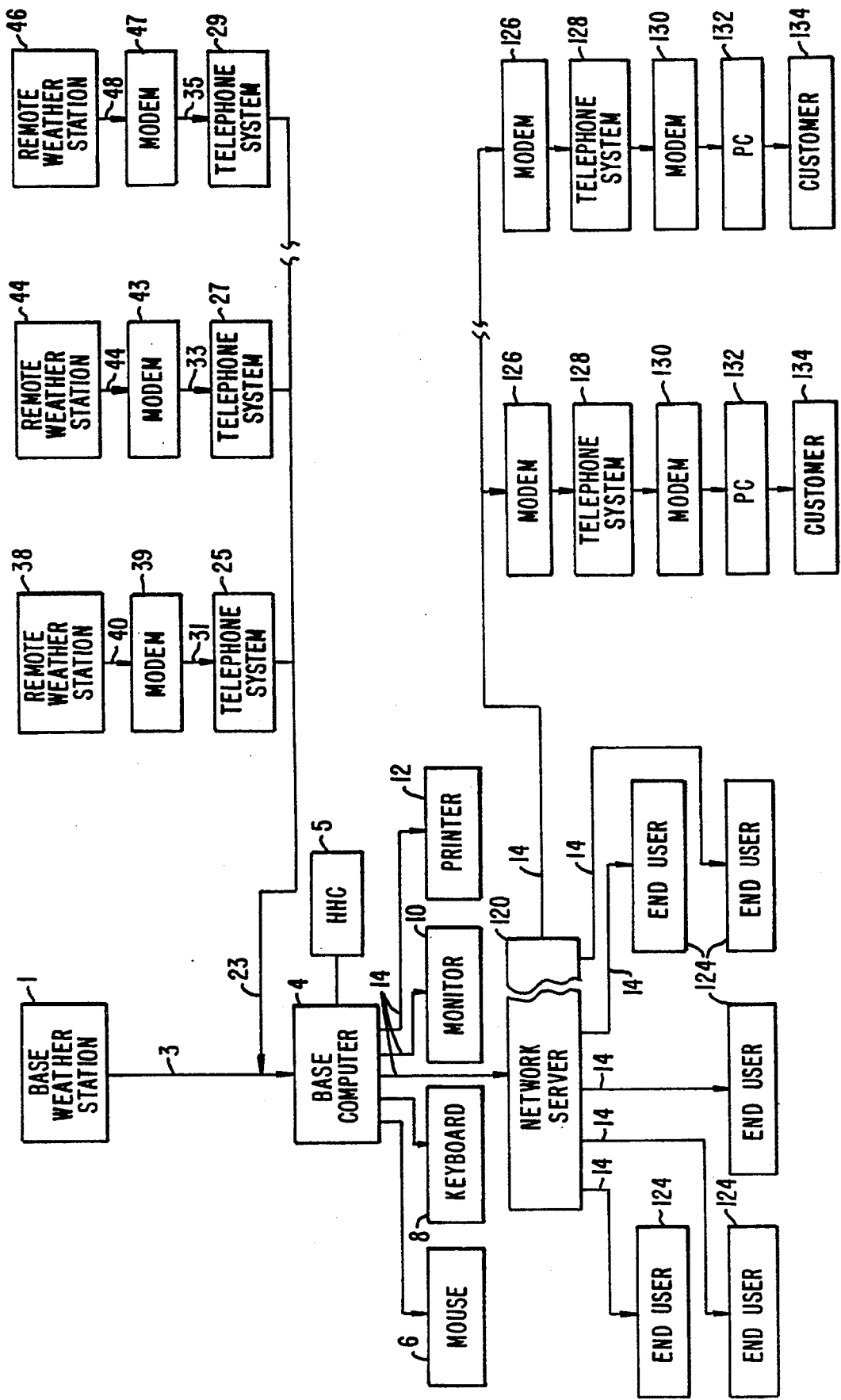
FIG. 5A is a schematic diagram of an alternate embodiment of the computer-based multi-station weather data collecting and reporting system of FIG. 1, wherein the output of the base computer, instead of being processed for and broadcast to television viewers, is sent to a network server which is, in turn, accessed by multiple local and/or remote end users (customers).

FIG. 5A is a schematic diagram of an alternate embodiment of the computer-based multi-station weather data collecting and reporting system of FIG. 1, wherein the output of the base computer, instead of being processed for and broadcast to television viewers, is instead sent to a network server 120 which is, in turn, accessed by multiple local and/or remote end users (e.g., Compuserve, Prodigy customers 124, 134). In this alternate embodiment, the network server 120 receives the screen display signal 14 from the base computer 4 and distributes that signal 14 directly to local end users 124, as in a LAN system, or indirectly—via modem 126, telephone system 128, modem 130, personal computer 132—to remote end users 134, such as customers of Compuserve, Prodigy and other similar systems.

Figure 5B:
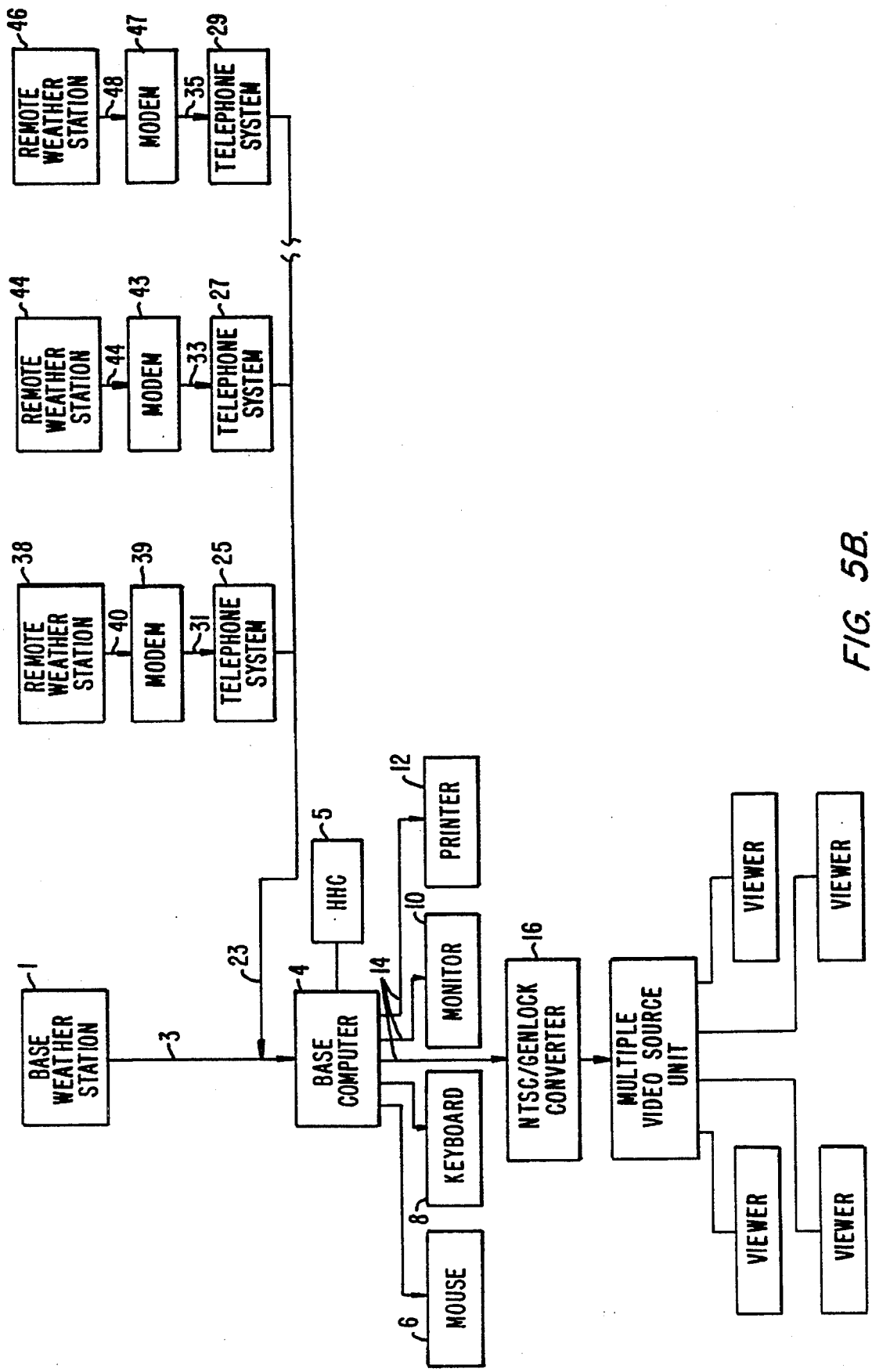
FIG. 5B is a schematic diagram of an alternate embodiment of the computer-based multi-station weather data collecting and reporting system of FIG. 1, wherein the output of the base computer, instead of being processed for and broadcast to television viewers, is sent to a multiple video source unit which is, in turn, accessed by multiple local and/or remote end users. Informational data and video are distributed via global satellite transmission, microwave, or coaxial (ground cable) as a video source for display on television or computer monitor. Multiple video source units are used to arrange the order the video signals, from different video sources, are sent to broadcast television transmitters.

FIG. 5B is a schematic diagram of an alternate embodiment of the computer-based multi-station weather data collecting and reporting system of FIG. 1, wherein the output of the base computer, instead of being processed for and broadcast to television viewers, is sent to a multiple video source unit which is, in turn, accessed by multiple local and/or remote end users. Multiple video source units are used to arrange the order the video signals, from different video sources, sent to television distribution systems. Data can be distributed from each site via global satellite transmission. Network users choose from a cross-sampling of each national or regional site. This differs from the direct television broadcast in that the broadcaster dials up his site and is limited to it. This allows a user to pull down data without phone transmission. It is designed for cable/satellite users.

The base computer 4 is programmed with Windows-based software written in "Visual Basic", a software program contained in a programmers kit provided by Microsoft Corp. for development of Windows-based software.

Figure 6:
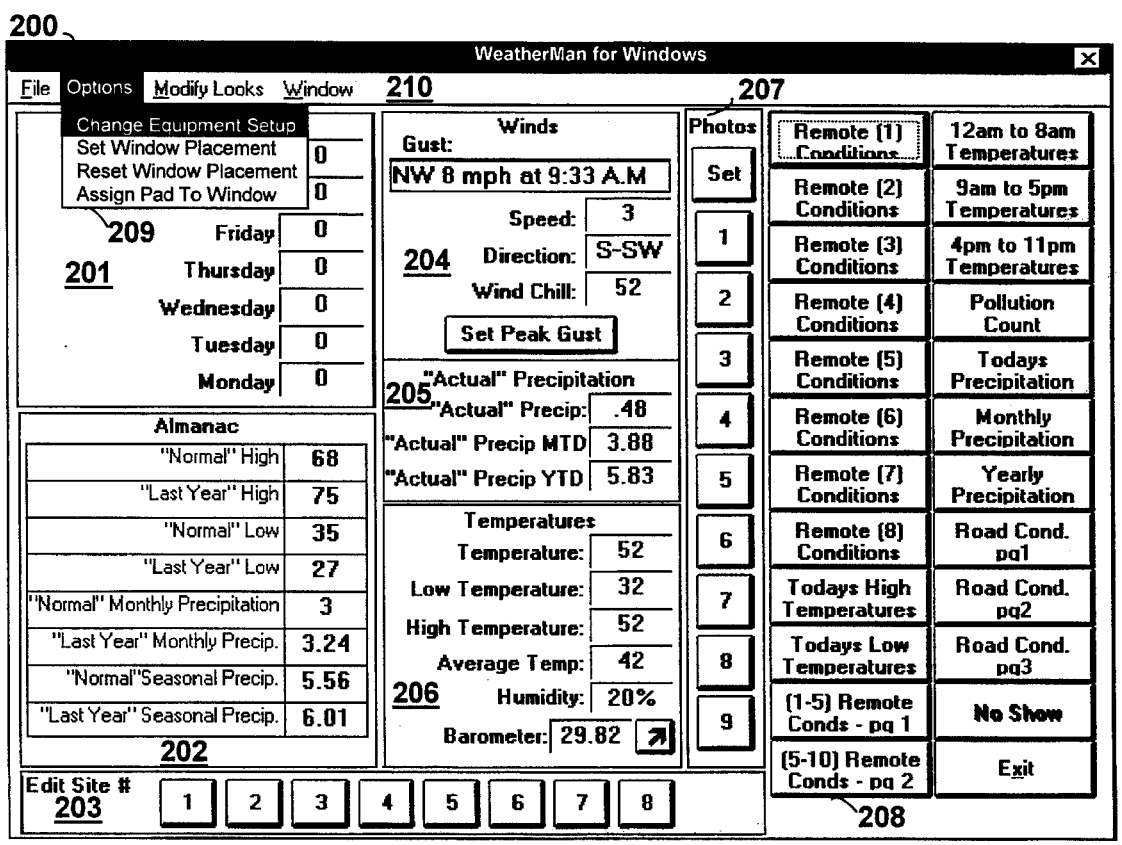
FIG. 6 is a printout of the computer screen comprising the basic Windows®-based work panel for the software of the present invention.

FIG. 6 is the basic work panel 200 for the software of the present invention which, as the panel shows, has been temporarily denominated "WeatherMan for Windows". "Windows" is a trademark of the Microsoft Corp. Use of the temporary denomination "WeatherMan for Windows" for this software is not meant to suggest that permission for use of that name in commerce has been obtained from Microsoft, or that the name has been or is being used in commerce with or without Microsoft's permission.

FIG. 6 shows that the basic work panel 200 eight different windows 201–208, and a pull down menu 209 of Options. This panel displays the current and historical weather conditions prevailing at the Base Weather Station 1 at the instant the screen is being viewed. For purposes of this description, the instant the screen is being viewed is referred to as "Instant 1" or "Moment 1"; and the day of the month on which the screen is being viewed is referred to as "Day 1".

Figure 21:
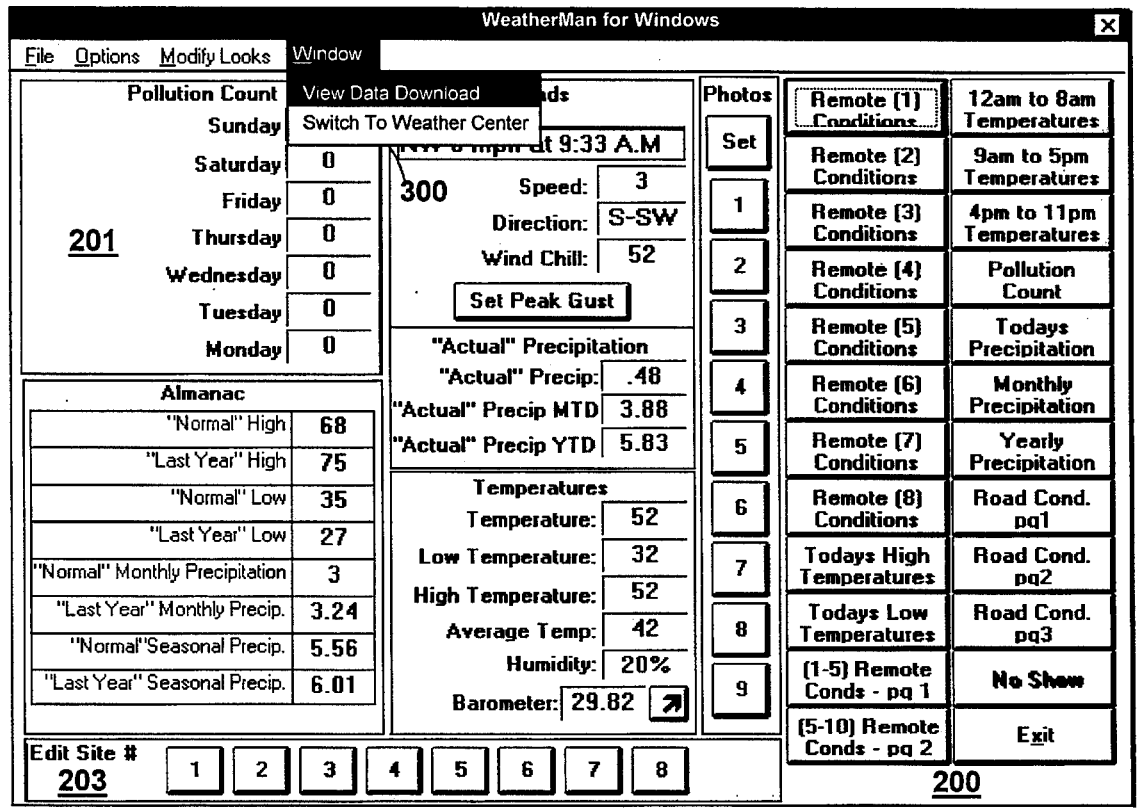
FIG. 21 shows the pull-down menu 300 for the Window category of control bar 210 in the screen shown in FIG. 6.

As best shown in FIG. 21, Pollution Count window 201 displays the pollution count for Day 1 in the uppermost box (here "Tuesday", and the pollution count for the previous six days in the boxes beneath.

The Almanac window 202 displays historical weather data for Base Weather Station 1, such as the Normal High Temperatures, which provides the median temperature for Day 1. If Day 1 were Tuesday, May 17, 1994, this display would show the median temperature for May 17 taken over the past X years, depending upon how much historical data is stored in the base computer 4. The Normal High Temperature for the following day, May 18, may be determined by clicking on "Wednesday" in window 201. Similarly, the Normal High Temperature for any day in the week following Day 1 may be determined by clicking on the appropriate day in window 201.

Almanac window 202 displays other historical data for Base Weather Station 1 such as Record High Temperatures (highest temperature on Day 1 taken over the past X years), Normal Low Temperatures (median low temperature on Day 1 taken over the past X years), Record Low Temperatures (lowest temperature on Day 1 taken over the past X years), Normal Precipitation MTD (median rainfall taken over the past X years for month to date, i.e. for the present month up to Day 1), Last Year Precipitation MTD (total rainfall for the present month to date, last year), Normal Precipitation YTD (median rainfall taken over the past X years for year to date, i.e. for the present year up to Day 1) and Last Year Precipitation YTD (total rainfall for the year to Day 1, last year). As with Normal High Temperature discussed above, all of these historical data displays are useful only to the extent that the appropriate historical data is stored in the computer 4 to allow the subject calculation to be made. Also as with Normal High Temperature discussed above, the historical data for any day in the week following Day 1 may be determined by clicking on the appropriate day in window 201.

Winds window 204 displays the current wind information at Base Weather Station 1, indicating that the Gust (peak wind gust so far for Day 1) was from the Northwest at 8 mph, at 9:33 AM; and that at Instant 1, the wind speed is three mph from the South Southwest, and that the windchill factor is 52. Although normally automatically logged, options exist to manually override Peak Gust as well as all other base and remote site data.

Actual Precipitation window 205 displays current precipitation information at Base Weather Station 1, indicating that the precipitation so far for Day 1 has been .48 inch, that the Actual Precip[itation] MTD (total precipitation month to date) has been 3.88 inches, and that the Actual Precip[itation] YTD (total precipitation year to date) has been 5.83 inches.

Temperatures window 206 displays current temperature information at Base Weather Station 1, indicating that the current temperature is 52 degrees Fahrenheit, that the low temperature so far on Day 1 has been 32 degrees, that the high temperature so far on Day 1 has been 52 degrees, that the Average Temp[erature] so far on Day 1 has been 42 degrees, that the Humidity is currently 0%, and that the Barometer (barometric pressure) is currently 29.82 and (as indicated by the upwardly pointing arrow) rising. This variable can also be shown as a letter (rising=R), etc.

Edit Site # window 203 allows the user to switch the control panel from Base Weather Station 1 to one of the Remote Weather Stations 38, 42, 46. As indicated by the buttons 1–8, Edit Site # window 203 allows the user to switch among eight different weather stations. The user operates window 203 by clicking on one of the buttons, e.g. button 2 which would convert screen 200 to the Set Remote Current Conditions control screen for site 2 (which might be Remote Weather Station 38).

Figure 12:
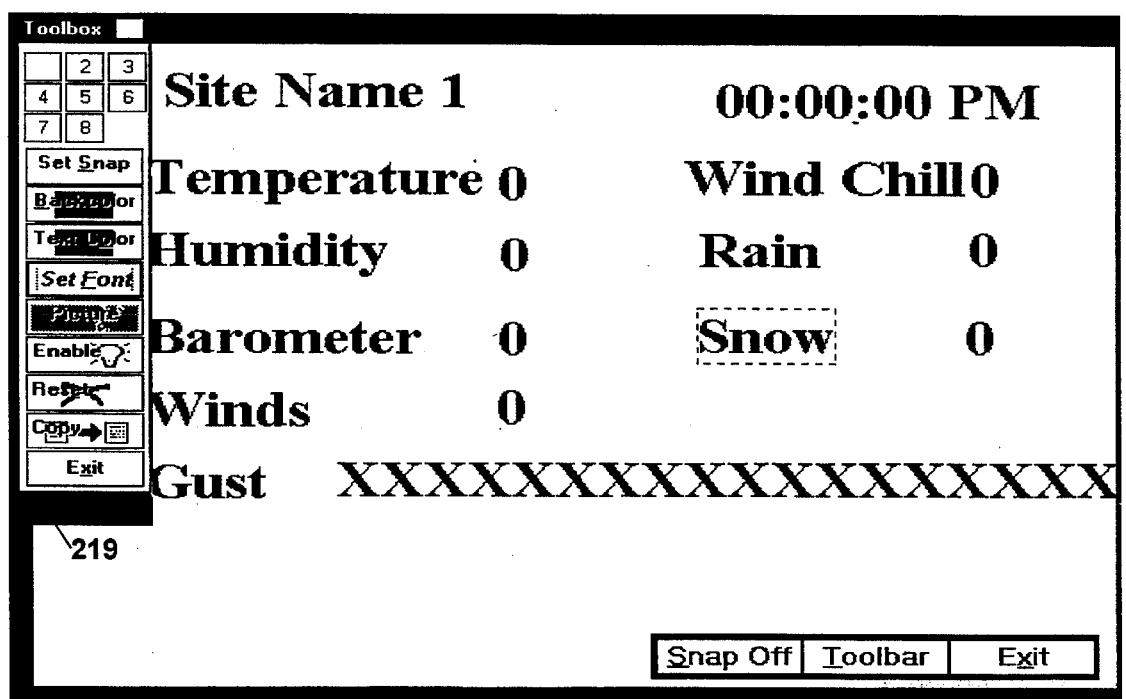
FIG. 12 illustrates the control screen for the Custom Layout submenu for the Current/Remote Conditions category in the pull-down menu 212 of FIG. 10.

The Set Remote Current Conditions control screen "Control Screen" 400 allows the user to modify the eight Remote [N] Conditions screens of window 208. When screen "Control Screen" for Site 2 appears, the Site 2 button will be highlighted. Clicking on the buttons in Automatic/Gust/Picture/Default panel "Button Panel" will toggle between Automatic and Manual operations for Wind, Temperature, Barometer, Rain, Humidity and Windchill. At the same time, the adjacent Label Panel, will switch between the words "Automatic" and "Manual," e.g., "Automatic Wind"/"Manual Wind." Clicking on the "Gust" button of Button Panel toggles to "Text," and permits entry of text in lieu of wind gust data, which text will then appear in Label Panel. Clicking on "Picture" button in Button Panel toggles to "Name." "Picture" indicates that the screen will have, for its title bar 409 (see FIG. 7A), the bit mapped image shown in a Site Panel on the Control Screen. Clicking on a File button on the Control Screen will scroll through the file names and locations of all bit mapped images stored in the computer. The ability to place a bit mapped image in title bar 409 allows display, for example, of the name and logo of a sponsor. Clicking "Name" allows the user to type text, e.g., the name of the location of that weather site, into the title bar 409 of the Remote [N] Conditions screen (see FIG. 7A). Clicking "Default" button in Button Panel toggles to "Custom," and the Custom Remote [N] Conditions control panel 217 screen will appear, as shown in FIG. 12. "Custom" allows the user to develop a custom Remote [N] screen. Clicking the Exit button of control screen 217 returns to Set Remote Current Conditions Control Screen, with "Default" and "Default Screen" reappearing on the associated Button Panel and Label Panels, respectively.

The settings of Set Remote Current Conditions control screen 400 for a particular site determine the format of the Remote [N] Screen for that site. If Site 2 were at Tahoe City, Calif., the default screen for the Remote [2] Conditions button of window 208 might appear as shown in FIG. 7A.

Once a particular Remote [N] Conditions screen has been laid out (e.g., with custom control screen 217 of FIG. 12) and saved, that screen becomes the Default Screen for that Remote [N] Conditions screen. Thus, if weather station 2 has a different combination of weather instruments than Base Weather Station 1, the composition of the Remote [N] Conditions default screen for Site 2 would be different from the default screen at site 1. For example, if weather station 2 were positioned at Lake Tahoe and had a (lake) water temperature sensing instrument, the Remote [N] Conditions screen for weather station 2 would include an additional line for lake water temperature.

Figures 7E, 7F:
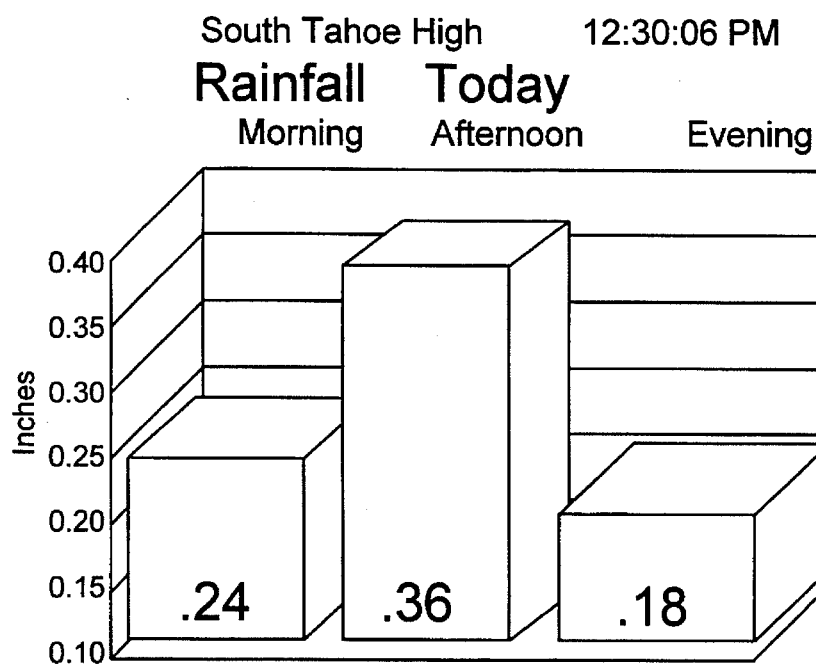
FIG. 7E is a sample screen which might appear by clicking on the "Today's Precipitation" button in panel 208 of FIG. 6.
FIG. 7F is a sample screen that might appear by clicking the "Road Cond." button in panel 208 of FIG. 6.

Windows 207 and 208 control access to various display screens, for displaying the data from the various weather stations in a graphic or graphic/pictorial format. When the No Show button of window 208 is clicked, the button toggles to Showtime. In Showtime, the Data Screens are loaded into RAM so that the user may switch from screen to screen rapidly. In No Show, each Data Screen must be loaded from the hard drive. Conversion to Show Time greatly enhances the screen switching speed, which can be desirable for use in television presentation. When the Exit button of window 208 is clicked, the program ends. However, clicking any one of the remaining buttons in windows 207 and 208 will shift to an entirely different screen display Clicking on any one of the buttons in window 208 (other than Exit and No Show) will shift to a screen display of current and/or historic weather information from one or more of the eight sites. Thus, clicking on Remote [2] Conditions in window 208 will display the screen shown in FIG. 7A. This screen displays weather data from the weather station designated Site #2 (e.g. a Weather Station at Tahoe City, Calif.). The Remote [2] Conditions screen displays the site name (Tahoe City), temperature (45 degrees Fahrenheit), humidity (10%), barometric pressure (29.45), windspeed (5 mph, from the North Northeast), current time (3:47 p.m.), wind chill (35 degrees Fahrenheit equivalent), rainfall (0.43 inches, so far today) and peak gust (N.E. 35 mph at 2:10 P.M.) The other Remote [N] Conditions in window 208 are similar to the screen shown in FIG. 7A, but display the weather data collected at weather station N, where N is one of the weather station sites 1–8. Cl "Today's High Temperatures" and "Today's Low Temperatures" display Day 1's high and low temperature, respectively, at one of the eight Weather Station sites, together with historic data for that site, such as the high and low temperatures at that site, respectively, for the past two years, as illustrated by FIG. 7B. "[1–5] Remote Conds—pg 1" and "[5–10] Remote Conds—pg2" each display a small sample of weather data from each of five Weather Station sites, as illustrated, for example, in FIG. 7B. "12pm to 8am Temperatures", "9 am to 5pm Temperatures", and "4pm to 11pm Temperatures", display hourly temperatures for Day 1 during the eight/nine hour periods indicated. "Pollution Count" displays the pollution count for the week ending with Day 1, as illustrated, for example, in FIG. 7D. "Today's Precipitation" displays the rainfall for Day 1, arrayed into the morning, afternoon and evening hours, as shown in FIG. 7E. "Monthly Precipitation" displays the monthly precipitation at a particular site for the year ending on Day 1. "Yearly Precipitation" displays the yearly precipitation at a particular site for the past X years. "Road Cond[itions] pg1", "Road Cond[itions] pg2" and "Road Cond[itions] pg3" each display current road conditions at each of four different sites, as shown for example in FIG. 7F.

Clicking on any one of the buttons in the Photos window 207 will display a bit-map image of frozen video, background or pattern. "Set" refers to FIG. 8A where choices for Photos 1–9 are made (as in FIG. 19; 288–290), whereas Photos 1–9 might be nine different photos, typically satellite and ground level photos of the particular weather station site. These photo images can be shown separately, or they can provide background for the screens of window 208.

The HHC 5 includes a keypad which allows random access to the screens shown in windows 208 and 209 when the HHC 5 is connected to the parallel port of the base computer 4.

The software is flexible so that the user can modify the input and output options to suit his particular needs. Thus, the screen display includes a control bar 210 across the top of the screen, with File, Options, Modify Looks, and Window categories, each of which has its own pull down menu 209.

The pull down menu for the Options category has four subcategories, Change Equipment Setup, Set Window Placement, Reset Window Placement, and Assign Pad to Window.

Change Equipment Setup allows the user to adjust the internal settings for the hardware. For example, this choice allows the user to control how fast the hand held controller (HHC) 5 responds to the touch i.e. how much time it takes to jump from one picture to another; adjust comport settings for the HHC; enable/disenable the HHC; adjust the sampling rate of data from remote sites; set parallel port values; keypad enable/disenable. Using the controller slows overall operation somewhat, which is why the option exists to disable it when not in use.

The windows 201–206, and any screens generated by clicking the buttons in windows 207–208 are the windows/ screens which contain weather data. For convenience, these windows/screens will be sometimes referred to herein as Data Screens.

Set Window Placement allows the user to size and place the different windows 201–206 on the screen 200, as well as any other screens generated by clicking the buttons in windows 207–208. Reset Window Placement sets the Window Placement to a default setting.

Figure 8A:
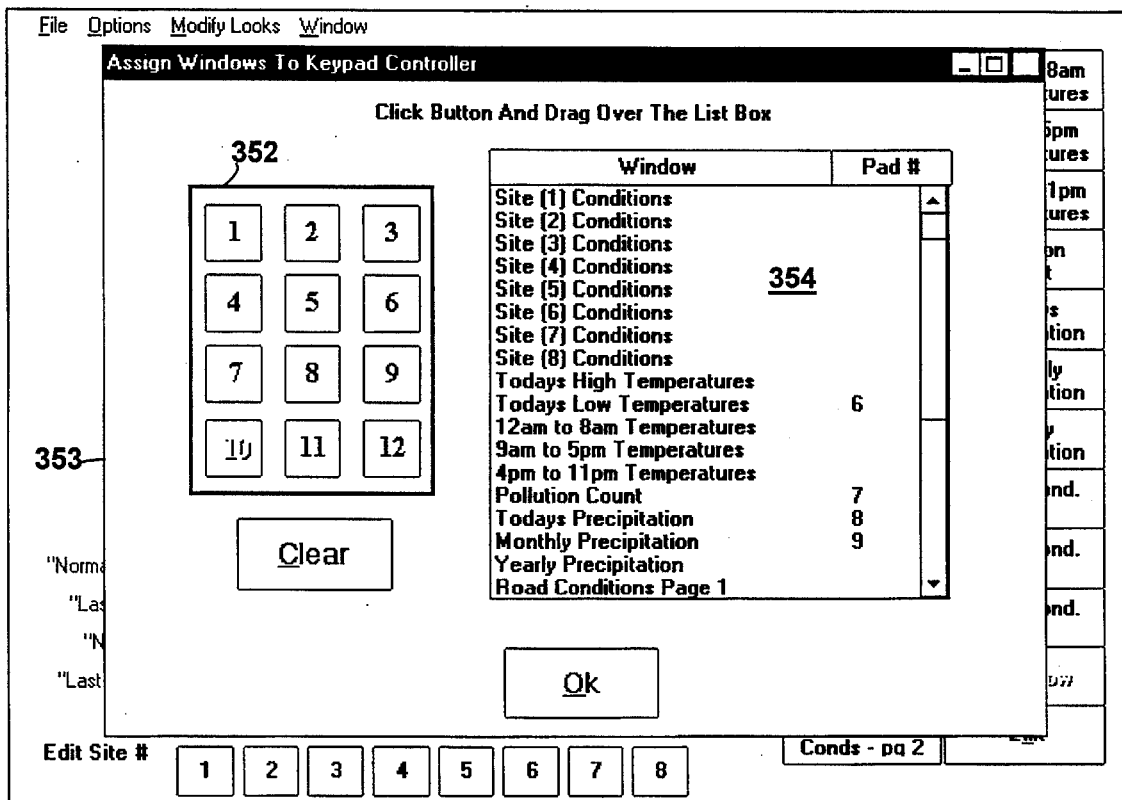
FIGS. 8A and 8B depict the screen which appears as a result of clicking the Set button in panel 207 of FIG. 6.
Figure 8B:
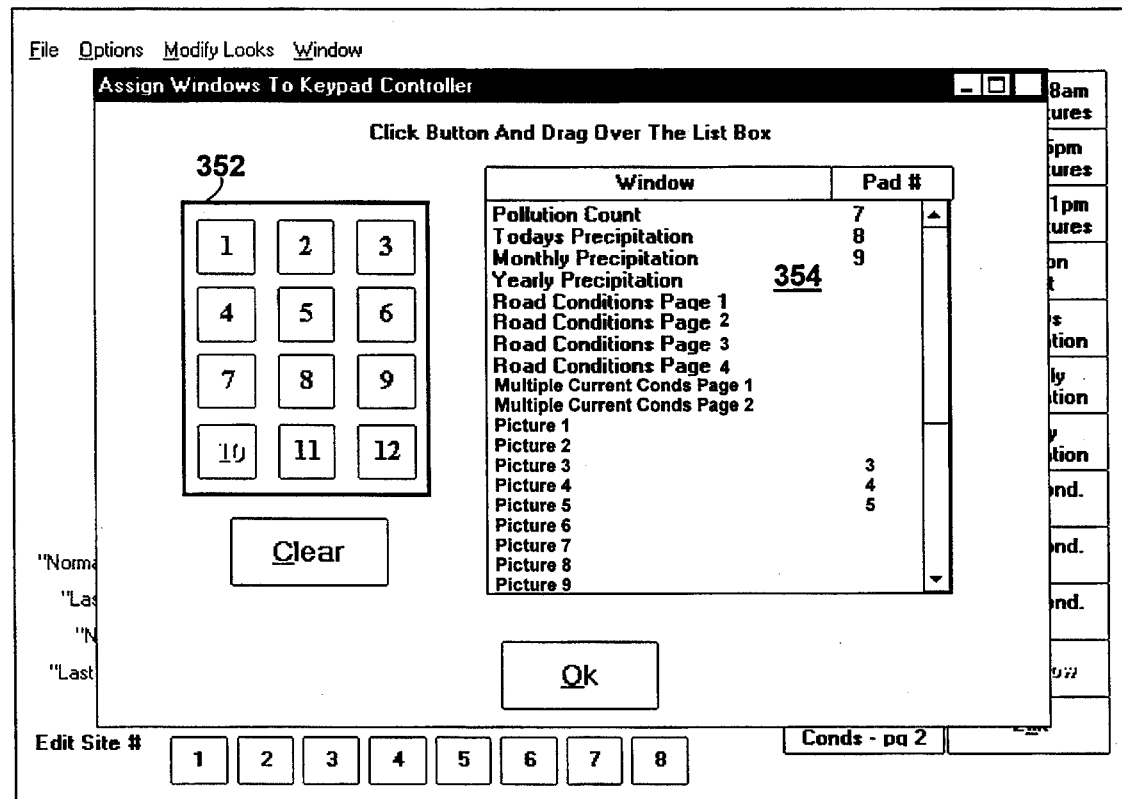

FIGS. 8A and 8B illustrates the control screen 353 for the Assign Pad To Window command of pull down menu 209. Assign Pad To Window allows different Data Screens to be assigned to the keys of the HHC keypad. This allows the user to select and prearrange a particular order in which to display the Data Screens, as might be convenient for a television weatherperson planning his or her weather broadcast performance or the keys can be preset for mass customer usage (e.g., Compuserve). A Data Screen is assigned to a key by first clicking on a key in keypad panel 352 and then dragging the cursor to Data Screen of choice in Window panel 354. Window panel 354 is a scrollable listing of all Data Screens in the base computer 4.

Figure 9:
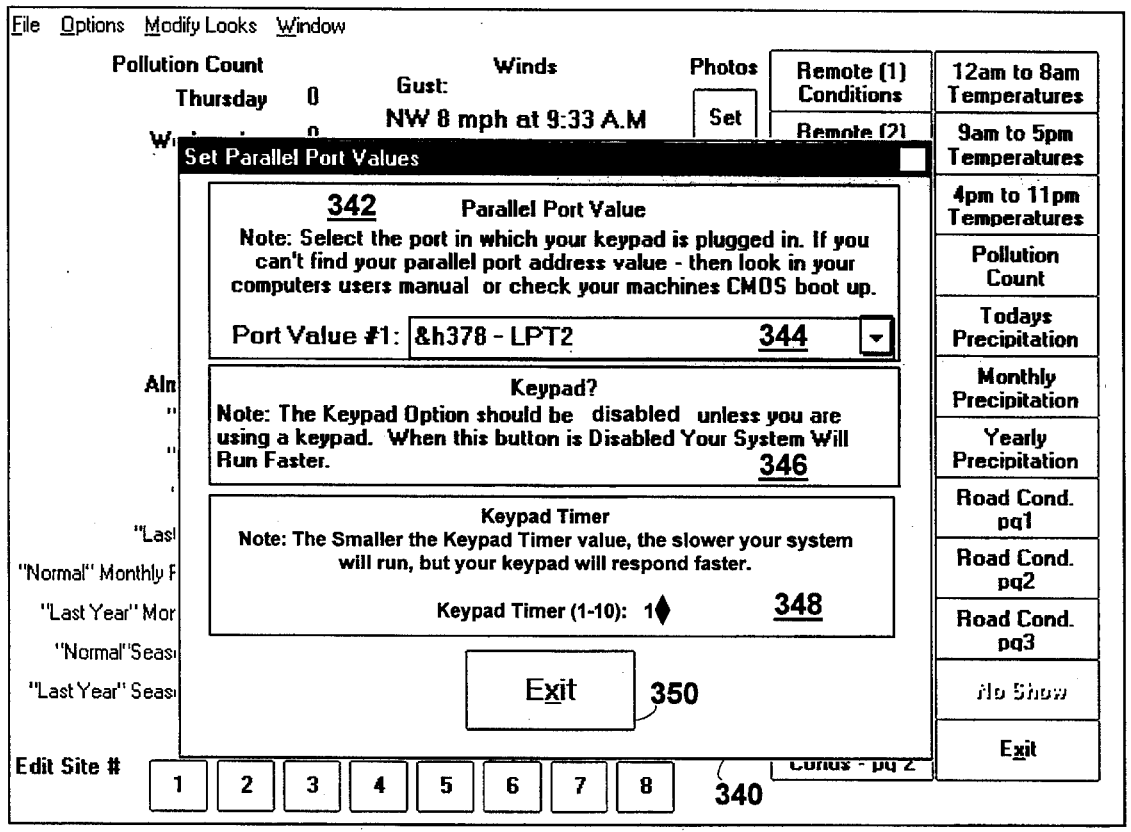
FIG. 9 illustrates the Set Parallel Port Values screen accessed by clicking on the Change Equipment Setup Line of pull-down menu 209 in FIG. 6.

FIG. 9 illustrates the Set Parallel Port Values screen 340, which is accessed by clicking on the Change Equipment Setup line of pull down menu 209 under Options on the control bar 210. Parallel Port Value panel sets conventional port address values needed for communications. A scrollable list of port address values 344 allows the user to select the appropriate port address value for his system from among a list of port address values. A Keypad panel 346 allows the user to toggle between keypad enabled/disabled. See discussion of hand held controller (HHC). A Keypad Timer panel 348 allows the user to adjust the response speed of the keypad, which controls how fast the screens switch in response to keypad commands. Exit button 350 returns the user to the main menu.

Figure 10:
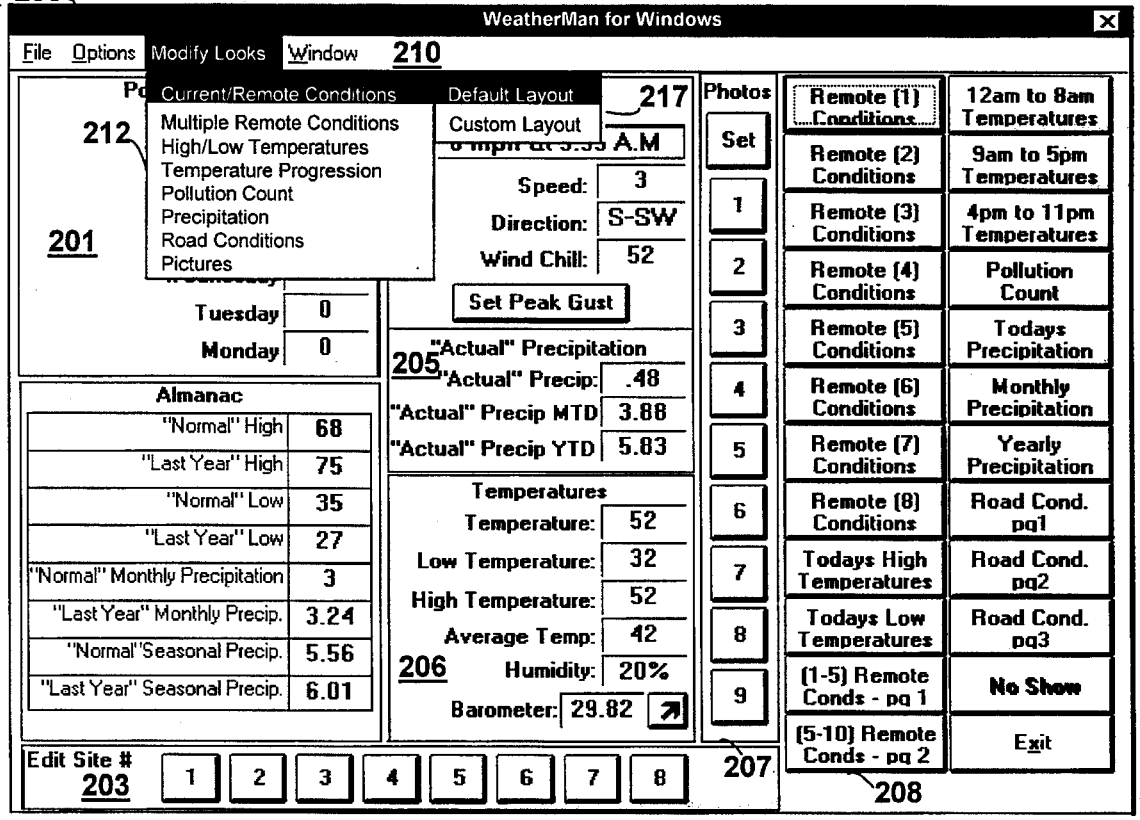
FIG. 10 shows the pull-down menu corresponding to the Modify Looks category in control bar 210 of FIG. 6.
Figure 11:
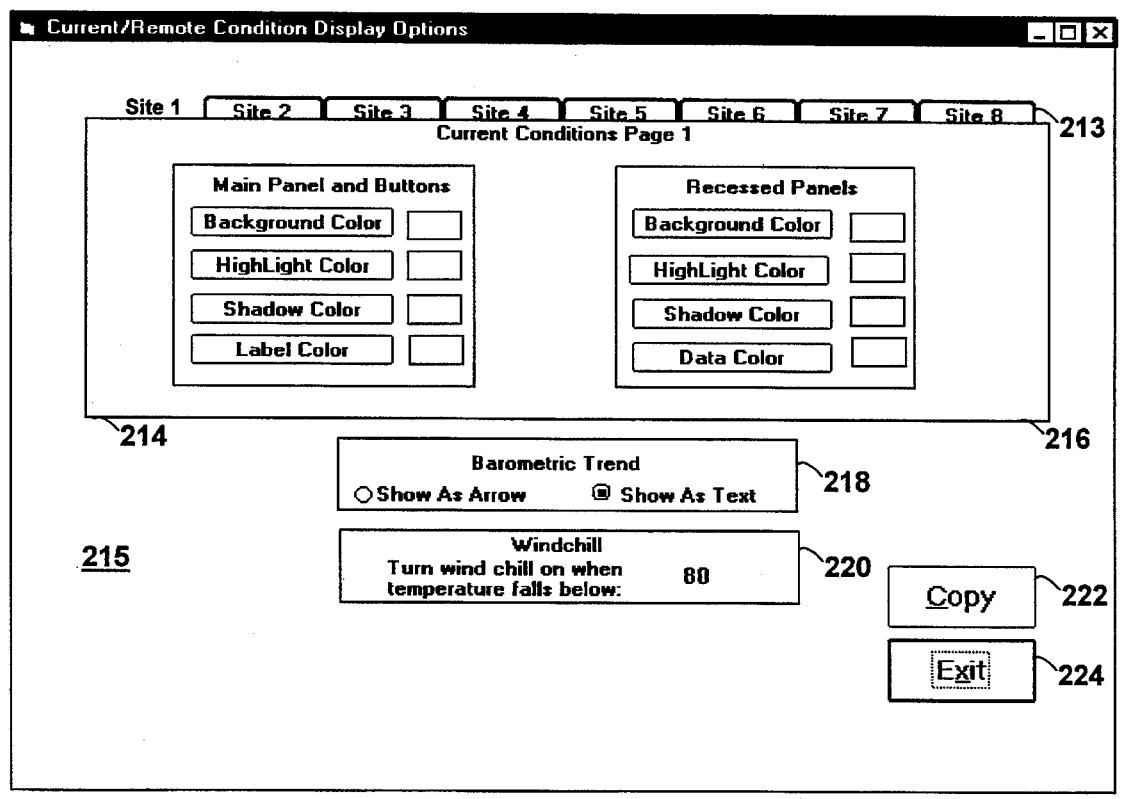
FIG. 11 illustrates the control screen for modifying the look of the current weather data at any one of eight weather stations for the eight Remote [N] Conditions screens listed in panel 208 of FIG. 6.

FIG. 10 shows the pull down menu 212 for the second category on the control bar 210, "Modify Tools." The subcategories on the menu 212 for Modify Tools are Current/Remote Conditions; High/Low Temperatures; Temperature Progression; Pollution Count; Precipitation; Road Conditions; Pictures. These subcategories correspond to the Data Screens in windows 207 and 208 of control screen 200. As illustrated by FIG. 11, Modify Tools allows the user to select different color schemes for each of the Data Screens, and to choose from which site data is to be displayed.

FIG. 11 (denominated Current/Remote Condition Display Options on the Title Bar) illustrates the control screen 215 for modifying the look of the current weather data at any one of the eight weather stations for the eight Remote [N] Conditions screens listed in window 208. As shown in FIG. 11, the control screen 215 includes a Site bar 213, to select the Data Screen for a particular weather station; a Main Panel and Buttons control panel 214 to set the color of the main panel and buttons of the Remote [N] Conditions Data Screen; a Recessed Panels control panel 216 for the recessed panels of that Data Screen. Control panel 218 governs whether the barometric trend will be shown as an arrow or text ("up", "down"). Control Panel 220 governs the temperature at which the Data Screen will commence displaying values for the Windchill factor (it being meaningless when temperatures are very warm). When the user is satisfied with the colors and other selections displayed on control screen 215, he saves that configuration by clicking on the Copy button 222, and then the Exit button 224 to exit this particular subroutine.

Pull down menu 212 of FIG. 10 (Modify Looks) includes a submenu 217 for Default Layout and Custom Layout subcategories under each main menu category. Thus, the Default and Custom Layout submenu for the Current/Remote Conditions category is shown in FIG. 10. FIG. 11 illustrates the control screen for Default Layout; whereas FIG. 12 illustrates the control screen for Custom Layout. The Custom Layout control screen includes a toolbar 219, which allows the user to make custom changes in the colors and fonts of the subject Data Screen, and choose the type of background (bit map image or live video or video captured picture).

Figure 13:
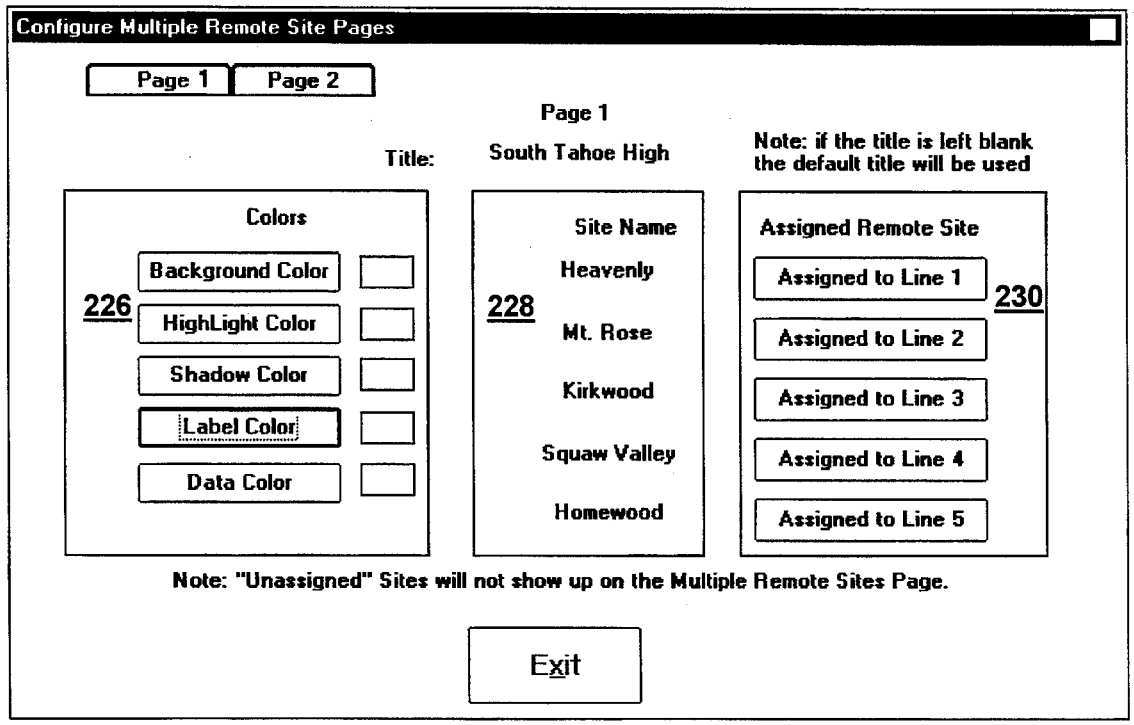
FIG. 13 illustrates the control screen for the Configure Multiple Remote Conditions category of the Modify Looks menu 212 shown in FIG. 10.

FIG. 13 illustrates the control screen for the Configure Multiple Remote Conditions category of the Modify Looks menu 212. This control screen corresponds to the "[1–5] Remote Conditions—pg 1" Data Screen (illustrated by FIG. 7C) of window 208. "Colors" panel 226 illustrates the colors of the Default Layout for this Data Screen. Site panel 228 allows the user to enter any five of the eight weather station sites, and the names and data of those sites will be assigned to lines 1–5 of the Data Screen in accordance with the line assignments of panel 230.

Figure 14:
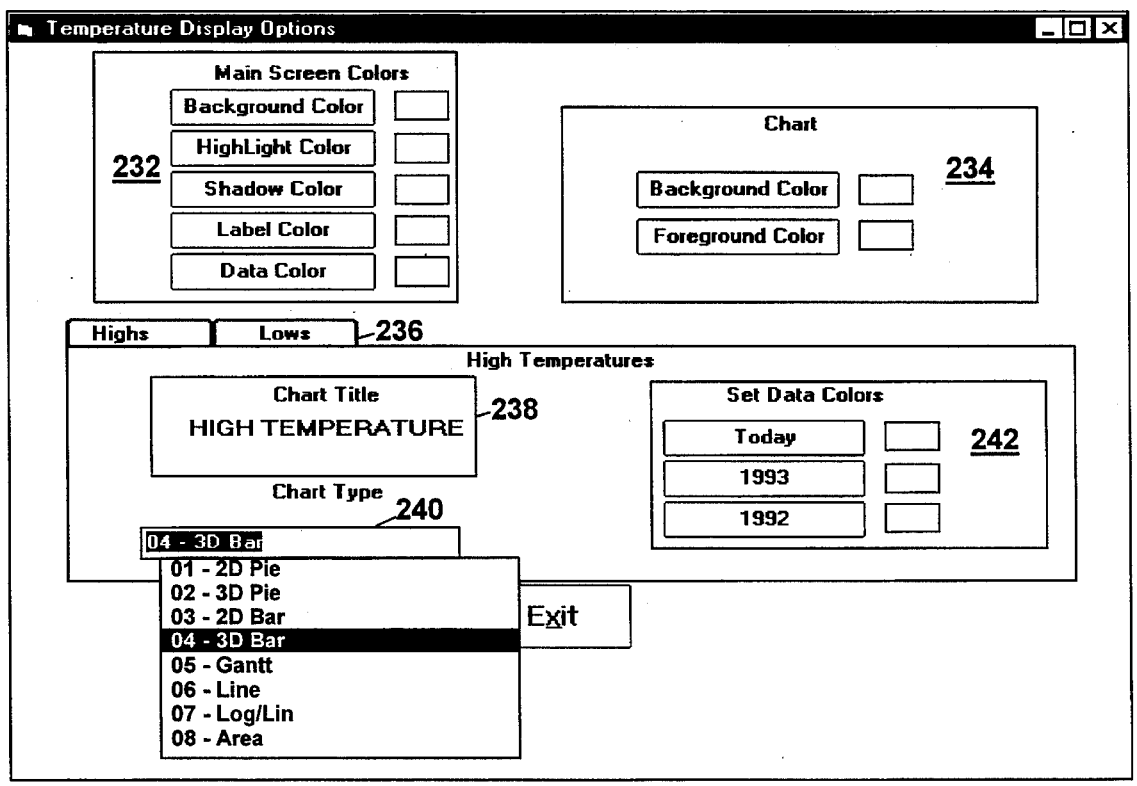
FIG. 14 illustrates the control screen for the High/Low Temperatures category of the Modify Looks menu 212 in FIG. 10.

FIG. 14 ("Temperature Display Options") illustrates the control screen for the High/Low Temperatures category of the Modify Looks menu 212. This control screen corresponds to the "Todays High Temperatures" and "Todays Low Temperatures" Data Screens (the former being illustrated by FIG. 7B) of window 208. "Main Screen Colors" panel 232 and Chart panel 234 illustrate the colors of the Default Layout for this Data Screen. Highs/Lows panel 236 allows the user to toggle back and forth between the control panels for "Todays High Temperatures" and "Todays Low Temperatures" Data Screens (FIG. 14 illustrates the former), respectively. Chart Title panel 238 allows the user to enter an appropriate title for the chart. Chart Type panel 240 allows the user to scroll among and select from a variety of different graph types for displaying the subject data including, in addition to those graph types shown in panel 240, "09-Scatter", "10-Polar", "11-Hi-Low Close", "12-Bubble", "13-Tape" and "14-3D Area". Set Data Colors panel 242 assigns a separate color to each category of data. As indicated here, and illustrated in FIG. 7B, current data is shown, for example, in red, while 1993 and 1992 data are shown in yellow and green respectively. Colors are the user's choice.

FIG. 15 ("Set Temperatures") illustrates control screen for the Temperature Progression category of the Modify Looks menu 212. This control screen corresponds to the "12pm to 8am Temperatures", "9 am to 5pm Temperatures", and "4pm to 11pm Temperatures" Data Screens of window 208. Temperatures From Midnight To 8am panel 246, Temperatures From 9am To 5pm panel 248 and Temperatures From 4pm to 11pm panel 250 correspond to "12pm to 8am Temperatures", "9 am to 5pm Temperatures", and "4pm to 11pm Temperatures" Data Screens, respectively.

FIG. 16 illustrates the Set Temperatures control screen with pop up control panel 262 displayed. This control panel 262 displays automatically upon selecting the Temperature Progression category of the Modify Looks menu 212. Control Panel 262 vanishes automatically once a site is selected.

Figure 17A:
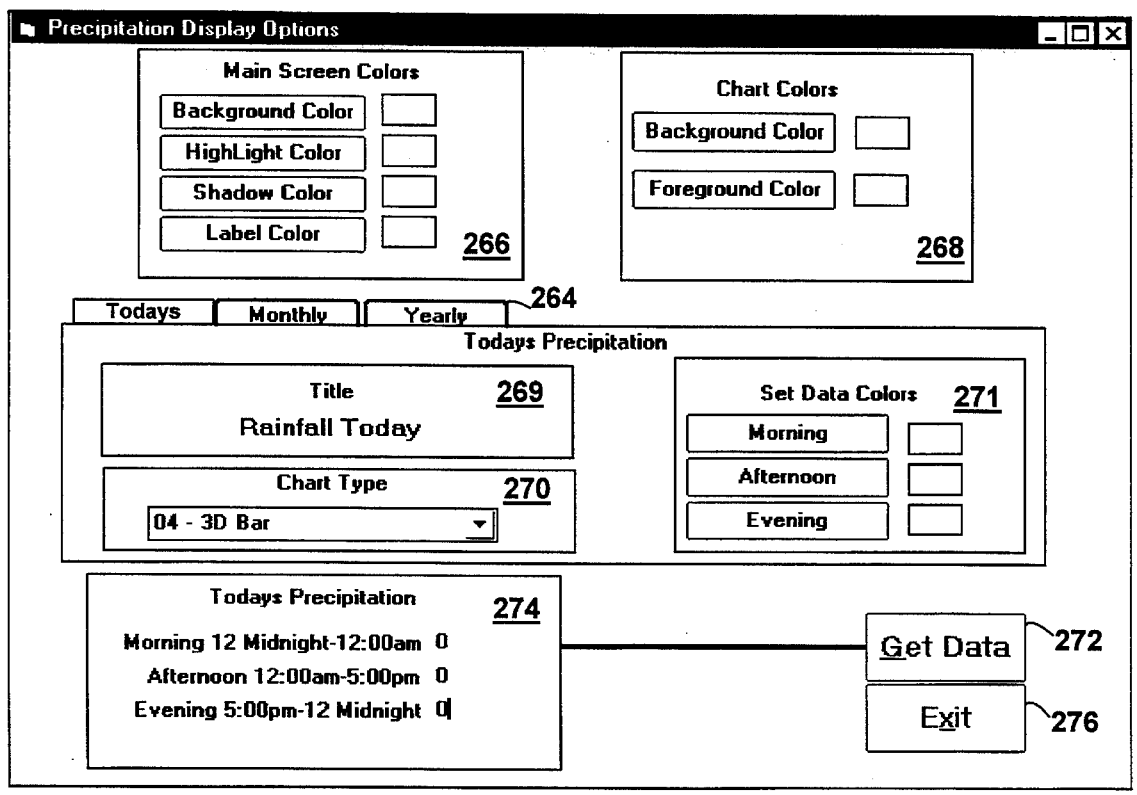
FIG. 17A illustrates the control screen for the Precipitation category of the Modify Looks menu 212 of the screen in FIG. 10.

FIG. 17A ("Precipitation Display Options") illustrates the control screen for the Precipitation category of the Modify Looks menu 212. This control screen corresponds to the Todays Precipitation, Monthly Precipitation and Yearly Precipitation Data Screens of window 208. Todays/Monthly/Yearly Panel 262 allows the user to toggle back and forth between the control panels for the Todays Precipitation, Monthly Precipitation and Yearly Precipitation Data Screens, respectively. When the user toggles from Todays to Monthly to Yearly on panel 262, the caption of panel 274 changes from Todays Precipitation, Monthly Precipitation, and Yearly Precipitation, respectively, and the data displayed in panel 274 changes accordingly. "Main Screen Colors" panel 266 and Chart Colors panel 268 illustrate the colors of the Default Layout for this Data Screen. Chart Title panel 269 allows the user to enter an appropriate title for the chart. Chart Type panel 270 allows the user to scroll among and select from a variety of different graph types for displaying the subject data. Set Data Colors panel 271 assigns a separate color to each category of data. As indicated here, and illustrated in FIG. 7E, current Morning precipitation data is shown in blue, while current Afternoon and Evening data are shown in purple and green respectively. Get Data button 272 allows the user to fill Todays Precipitation panel 274 with current precipitation data for Day 1. Exit button 276 allows the user to exit from this particular subroutine.

Figure 17B:
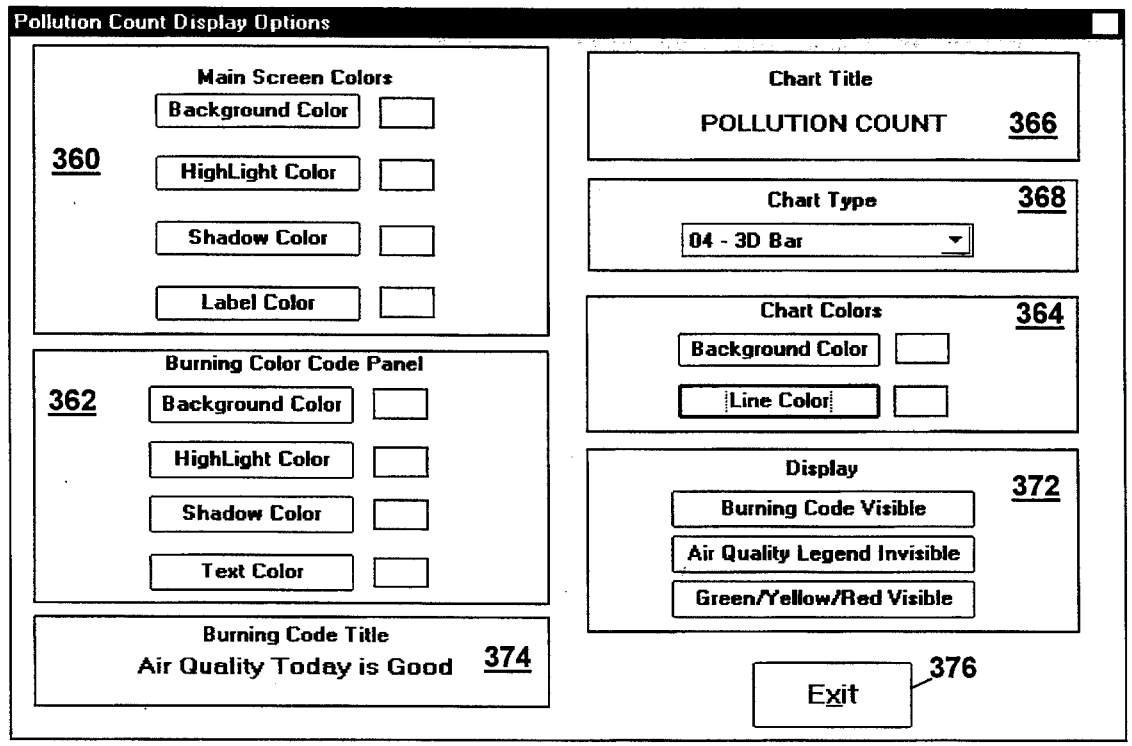
FIG. 17B illustrates the control screen for the Pollution Count category of the Modify Looks menu 212 of FIG. 10.

FIG. 17B ("Pollution Count Display Options") illustrates the control screen for the Pollution Count category of the Modify Looks menu 212. This control screen corresponds to the Pollution Count Data Screen of window 208. "Main Screen Colors" panel 360, Burning Color Code panel 362 and Chart Colors panel 364 illustrate the colors of the Default Layout for this Data Screen. Chart Title panel 366 allows the user to enter an appropriate title for the chart. Chart Type panel 368 allows the user to scroll among and select from a variety of different graph types for displaying the subject data. As indicated here, and illustrated in FIG. 7D, the burning code is color coded, and displayed in text and on the graph bars. Burning Code is a color code legislated by various municipalities to regulate when residents are permitted/not permitted to burn wood, trash or debris. Burning Code green indicates "safe to burn", while "please don't burn" and "you will be fined if you burn" are indicated by the colors yellow and red, respectively. Display panel 372 controls which special displays will be shown in addition to the graph or chart shown in FIG. 7D. Special displays are the Burning Code (the red, yellow, green vertical scale next to the graph in FIG. 7D), Air Quality Legend (text at the bottom of the graph in FIG. 7D, e.g. "Air Quality Today Is Good—23") and Green/Yellow/Red (the word "Green", "Yellow" or "Red" appearing in text next to the Air Quality Legend in FIG. 7D). Panel 374 Displays the text of the current Air Quality Legend, and permits the user to type in a different legend as desired. Exit button 376 allows the user to exit from this particular subroutine.

Figure 18:
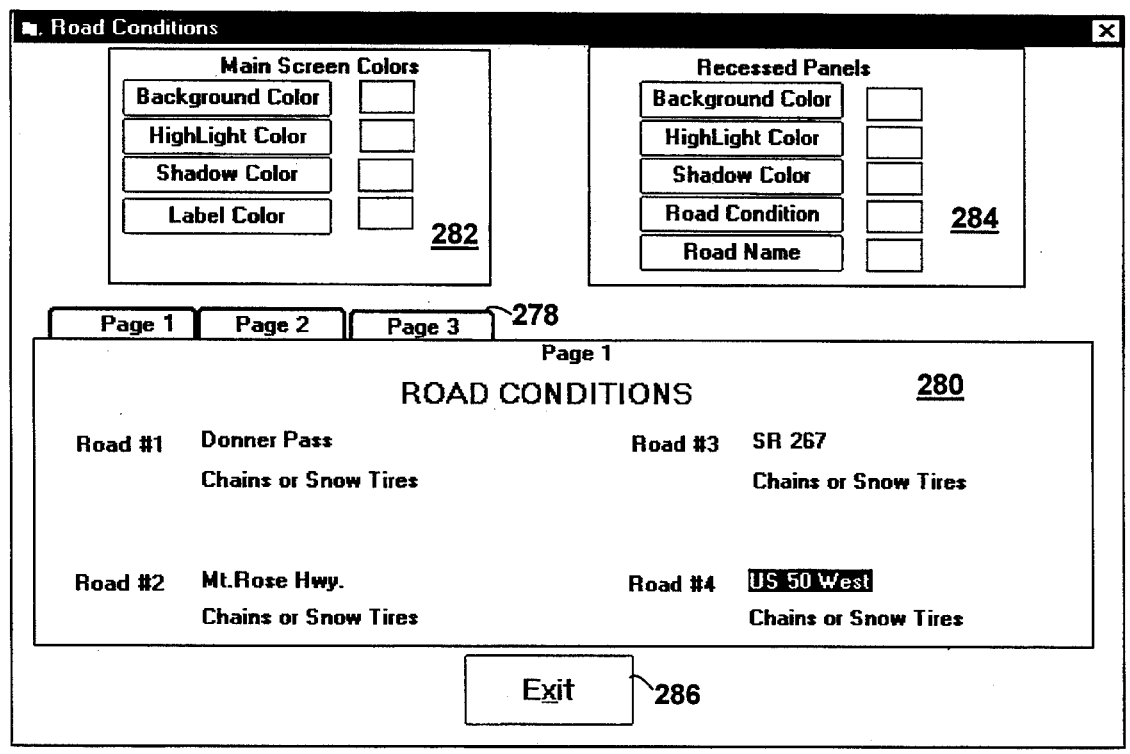
FIG. 18 illustrates the control screen for the Road Conditions category of the Modify Looks menu 212 of FIG. 10.

FIG. 18 ("Road Conditions") illustrates the control screen for the Road Conditions category of the Modify Looks menu 212. This control screen corresponds to the "Road Cond pg1", "Road Cond pg2" and "Road Cond pg3" Data Screens of window 208. Page 1/Page 2/Page 3 Panel 278 allows the user to toggle back and forth between the control panels for the "Road Cond pg1", "Road Cond pg2" and "Road Cond pg3" Data Screens, respectively. When the user toggles from Page 1 to Page 2 to Page 3 on panel 278, the caption of panel 280 changes from Page 1 to Page 2 to Page 3, respectively, and the data displayed in panel 280 changes accordingly. "Main Screen Colors" panel 282 and Recessed Panels panel 284 illustrate the colors of the Default Layout for this Data Screen. Panel 280 allows the user to enter information for four different sites. These sites do not necessarily correspond to weather station sites. Thus, the identification of each site (e.g "Donner Pass" for Road #1 and the advice entered for each site e.g. "Chains or Snow Tires" is entered manually. Exit button 286 allows the user to exit from this particular subroutine.

Figure 19:
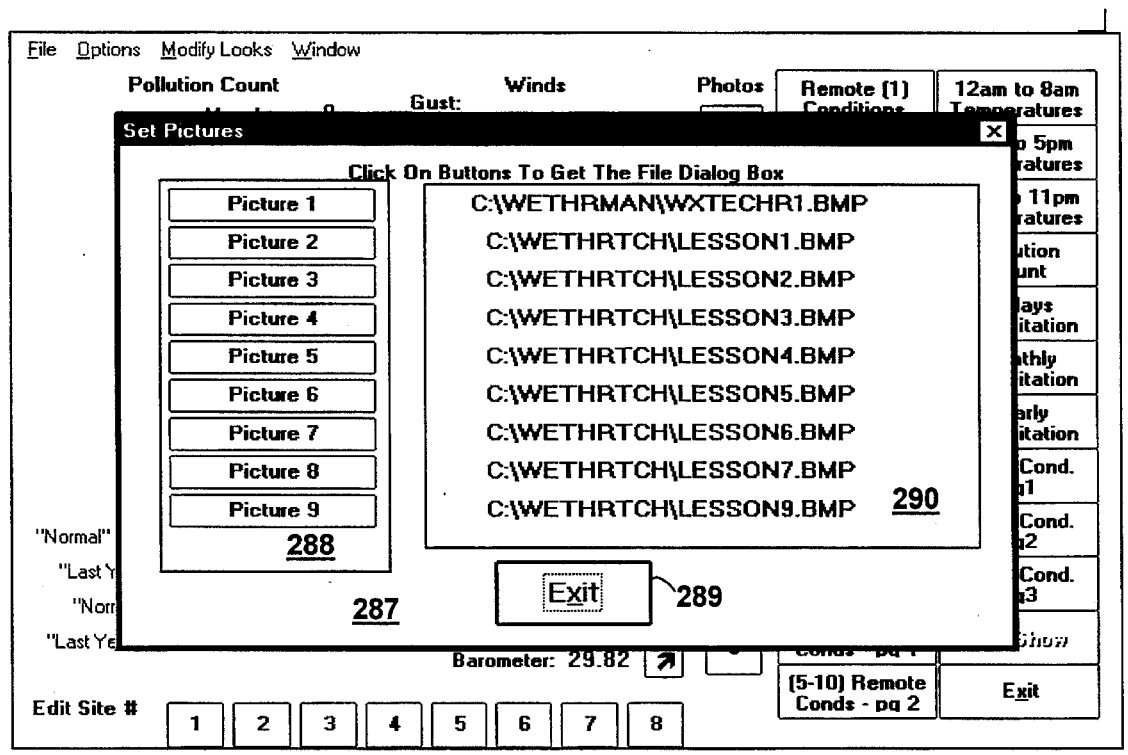
FIG. 19 illustrates the control screen 287 for the Pictures category of the Modify Looks menu 212 of the screen shown in FIG. 10.

FIG. 19 ("Set Pictures") illustrates the control screen 287 for the Pictures category of the Modify Looks menu 212.

Figure 20:
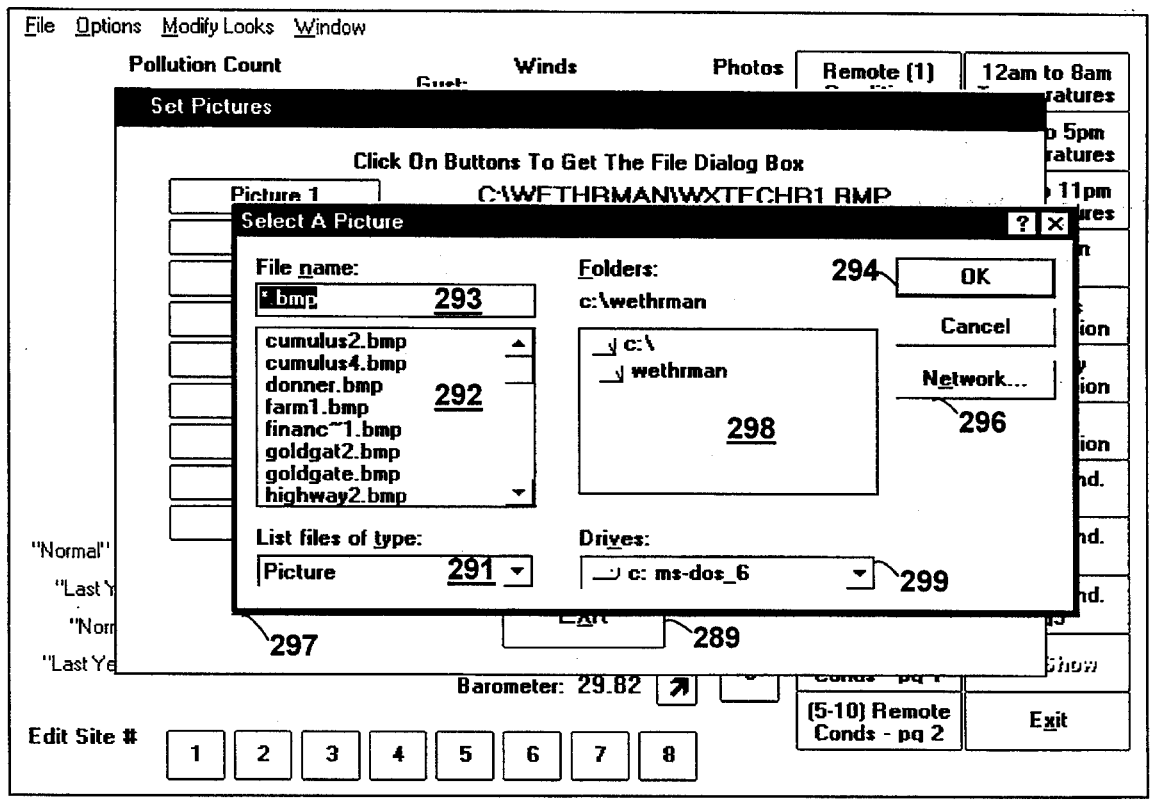
FIG. 20 illustrates the Select A Picture control panel which appears by clicking upon any one of the nine buttons in panel 288 in the screen of FIG. 19.

This control screen 287 corresponds to the "Photos" Data Screens of window 207. The nine buttons in column panel 288 ("Picture 1", "Picture 2", "Picture 3", . . . "Picture 9") correspond to the nine buttons "Set" and "1–8" in the Photos panel 207. Clicking on any one of the nine buttons in column panel 288 activates the Select A Picture control panel 297 illustrated in FIG. 20. The Select A Picture control panel 297 includes a listing 292 of all images stored in the base computer of the type shown in panel 291, having the file suffix shown in panel 293. Each image is given a separate file name and location. The file location is indicated by panels 298 and 299. Clicking upon a particular file name in panel 292, followed by clicking on the OK button 294 activates that file and assigns it to the previously clicked button of panel 288. Clicking on the Cancel button 296 ends the Select A Picture subroutine, and returns the user to the Set Pictures control panel of FIG. 19. Panel 290 of the control screen displayed in FIG. 19 lists the files (and their location) assigned to each button in panel 288. Clicking on Exit button 289 allows the user to exit from the subroutine of control panel 287.

FIG. 21 shows the pull down menu 300 for the Window category of control bar 210. Pull down menu 300 contains two categories, View Data Download and Switch To Weather Center.

Figures 22, 23:
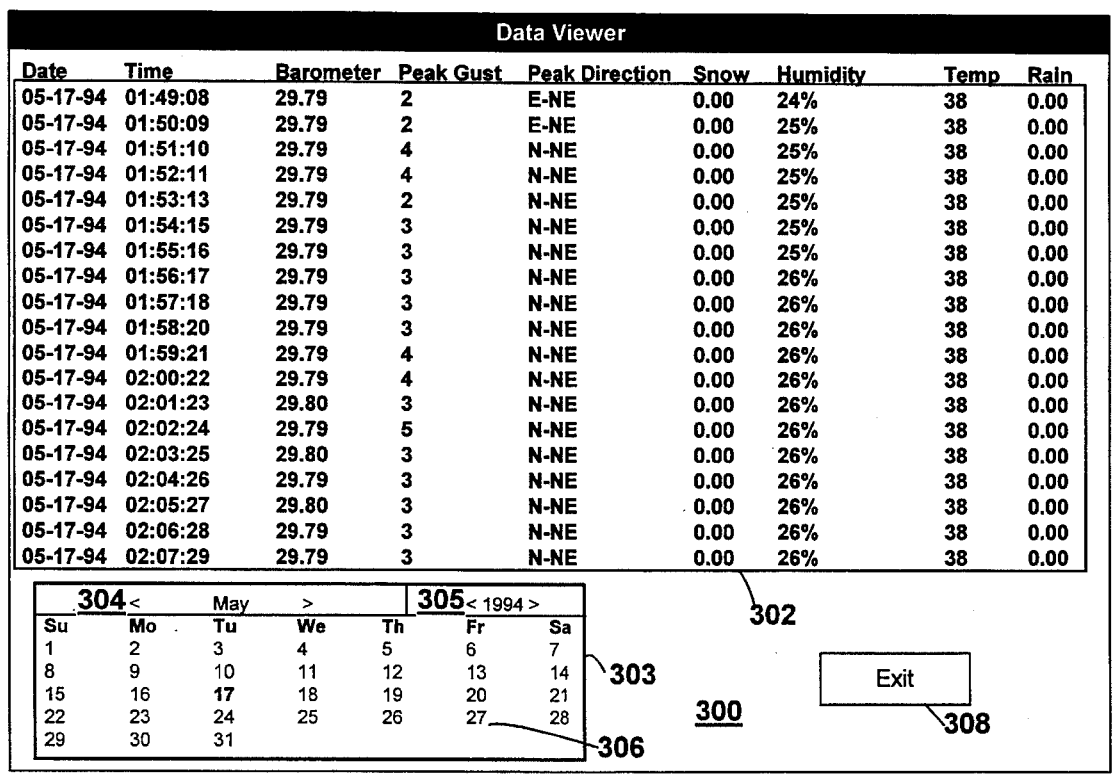
FIG. 22 is the Data Viewer screen which appears by clicking on View Data Download which appears after clicking upon Window in the control bar 210 of the screen shown in FIG. 6.
FIG. 23 shows the Weather Center screen which appears upon clicking on Window in control bar 210 of the control screen shown in FIG. 6.

Referring now to FIG. 22, by clicking on Window in control bar 210 of screen 200 (FIG. 6), the user is requested to choose a site. By clicking in View Data Download, the user is asked to choose one of the eight remote sites. Upon making that choice, Data Viewer screen 301 appears, as shown in FIG. 22. Data appearing in screen 301 is retrieved from the hard drive. The data so retrieved will be for the site selected. The first and second Data Viewer columns (Date and Time) list the instant when a particular set of weather parameters was collected by the base computer at the chosen site. All data is logged based on the user's choices from the configuration/set-up page as seen in FIG. 24 #314. If a user chooses to save data the program will take the reading at second #1 of each minute—wind is peak that minute, snow is total that minute, rain is total that minute (not cumulative for day). Each row of data adjacent to a particular date and time contains the following weather data Barometer (barometric pressure at that instant), Peak Gust (peak wind gust for the 60 seconds prior to that instant), Peak Direction (direction of the Peak Gust), Snow (snow that fell that minute), Humidity (at that instant), Temperature (at that instant), and Rain (rainfall for that minute). The main data window 302 contains a limited number of rows of data. Access to additional lines of data can be obtained by scrolling up or down in the window 302. Alternatively, rather than scrolling through the data, the user can easily jump to different dates by using calendar 303, which allows the user to scroll through the database on a month by month 304 and year by year 305 basis, and to select a particular day of the month by clicking on that day in the 31 day calendar section 306 of the calendar 303. Clicking on Exit button 308 allows the user to exit from the subroutine of Data Viewer screen 301.

FIG. 23 shows the Weather Center screen, which is accessed by first clicking on Window in control bar 210 of control screen 200 (FIG. 6), and then by clicking on the Switch To Weather Center line of pull down menu 300. This screen is a communications control panel which allows the user to use the base computer 4 to dial up the chosen remote weather site, by clicking on the Dial button. Upon establishing telephone communication between the base computer 4 and the remote site, the current weather data being collected by the remote weather station is displayed in the screen 310 on the monitor 10 of the base computer 4. Screen 310 displays a Digital Signal panel which evaluates the quality of the digital signal. Detection of a poor or nonexistent digital signal would warn the user that the data displayed in screen 310, and elsewhere in the system data may not be absolutely current and that the communication link between the base and remote computer may be intermittent and/or broken.

FIG. 24 shows the Configuration For Data Line 1 screen, which is accessed by clicking on the phone symbol 309 (FIG. 23) bearing the number of the desired site, and then by clicking on the wrench symbol 317. This opens up the Configuration for Data Line #[N] screen 312, shown in FIG. 24. This screen allows for the possibility that there may be more than one telephone line into any single remote weather station. Thus, the Select A Line To Configure panel 314 includes multiple buttons corresponding to multiple phone lines into a single remote weather station. Clicking on one of those buttons selects the line to configure. Communications Port Setup panel 315 allows the user to toggle to three (3) different communications setups. When toggled to "Use modem to connect", the selected telephone line is configured to operate with a conventional type of hookup as shown, for example, with Remote Weather Station 38, modem 39 and telephone system 25 of FIG. 1, where the Remote Weather Station is the type shown in FIG. 2. When toggled to "Connect direct to Davis", base computer is configured to operate with the Davis Instruments system described above, i.e. the Davis Weather Monitor II ™ display box, and Davis Weatherlink ™a interface modem. The AutoStartup panel 316 toggles on and off. When on, the base computer 4 dials up the remote computer whenever the communications link between them is broken. Weather Instrument Setup panel 318 (Barometer Adjustment) allows entry of a value which effectively corrects any erroneous barometer setting at the remote site, without the need to visit that site. If power at the remote site is lost, the barometer setting at the site is lost and must be reset. It is undesirable to travel to the site to reset the barometer. Instead, the correct barometer setting for that site can be determined (e.g., by communications with another observer in the nearby area, or by calculation from multiple barometer readings in surrounding areas). By setting Barometer Adjustment at what the barometer reading should be at that instant at that site, all readings from that barometer communicated to the base computer 4 are automatically adjusted to the correct reading. Weather Instrument Setup panel 320 (Rain Measurement) allows precipitation to be measured in either $\frac{1}{100}$ inch or $\frac{1}{10}$ inch. Modem Configuration panel controls various conventional communications settings and adjustments. Serial Port Settings panel 322 controls various conventional communications port settings and adjustments. Data Logging panel 324 toggles on and off the ability of the base and remote computers to save data (i.e. write data from memory to storage), and if such data is to be saved, indicates how often, if ever, the data is to be erased, and how often it will be saved. Snow Sensor panel toggles on and off between enabling and disabling the snow sensor, if one is employed at the weather station being configured, and if enabled assigning it to a port. Reset button will return the system to the default setup; Save button will save the configuration set up on screen 312; and Exit returns the user to the main menu.

What is claimed is:

1. A computer based weather detection and reporting system for collecting and formatting real time weather data to be used in live weather presentation, comprising a. a microprocessor based computer programmed to
  (1) receive digital signals encoding real-time weather data collected at a plurality of weather stations;
  (2) store and retrieve said digital signals to and from data storage;
  (3) store and retrieve predetermined default screen configuration buffers for generating data screens displaying alphanumeric and graphic displays of real-time weather data encoded in said digital signals;
  (4) send said digital signals to said screen buffers when said signals are received by said computer, so that said screen buffers are prepared to display the most current weather data received by the computer;
  (5) in response to an input device, select a plurality of said screen buffers to send to a means for displaying them;
  (6) provide a first plurality of option screens allowing a user to modify real-time weather data input and output options including appearance of said predetermined default screen configuration buffers and placement of screen buffers when displayed;
  (7) provide a second plurality of option screens allowing a user to assign an input device action to a particular selection of said screen buffers;
  (8) provide a third plurality of option screens allowing a user to modify received real-time weather data displayed in said screen buffers;
b. multiple weather stations, each comprised of
  (1) one or more weather instruments, each capable of sensing a particular weather parameter, and converting said sensed weather parameter into an analog electrical signal;
  (2) means for converting the analog signal from each said instrument into a series of digital electrical signals corresponding to the values of the sensed weather parameter over time;
c. means for communicating said digital electrical signals from said weather stations to said computer; and
d. means for transmitting said data screens incorporating current weather data received by the computer to multiple end users on a real time basis.

2. The system of claim 1 wherein said means for communicating said digital electrical signals from said weather stations to said computer is comprised of a modem coupled to the digital signal output of one or more of said weather stations, a modem coupled to the digital signal input of said computer, and a voice grade telephone system coupled between said modems.

3. The system of claim 1 wherein one of said weather stations is located proximate to said computer, and wherein the means for communicating said digital electrical signals from said one weather station to said computer is an electric cable.

4. The system of claim 1 wherein the means for transmitting said data screens to end users includes an NTSC/Genlock signal processor, where the computer converts said data screens into an output signal and sends said signal to said signal processor, and where said signal processor converts said data screen output signal into a television broadcast quality signal, and wherein said means for transmitting said data screens to end users further includes equipment for broadcasting said broadcast quality signal to television viewers.

5. The system of claim 1 wherein the means for transmitting said data screens to end users includes an NTSC/Genlock signal processor, where the computer converts said data screens into an output signal and sends said signal to said signal processor, and where said signal processor converts said data screen output signal into a television broadcast quality signal, and wherein said means for transmitting said data screens to end users further includes equipment for distributing said broadcast quality signal to television viewers via cable television facilities.

6. A computer based weather detection and reporting system for collecting and formatting real time weather data to be used in live weather presentation, comprising
e. a microprocessor based computer running a windows type operating system capable of simultaneously displaying data from a plurality of data sources in multiple windows programmed to
  (1) receive digital signals encoding real-time weather data collected at a plurality of weather stations;
  (2) store and retrieve said digital signals to and from a plurality of locations within a data storage, each location grouping data from a particular weather station;
  (3) store and retrieve predetermined default screen configuration buffers for generating data screens displaying alphanumeric and graphic displays of real-time weather data encoded in said digital signals, with at least one separate default screen configuration buffer associated with each of said plurality of weather stations, said default screen configuration buffer specifying which data from a particular weather station is to be presented and specifying formatting parameters for said data;
  (4) send said digital signals encoding real-time weather data to said screen buffers when said signals are received by said computer, so that said screen buffers are prepared to display the most current weather data received by the computer;
  (5) in response to an input device, select or switch between a plurality of said screen buffers to send to a means for displaying them;
  (6) provide a first plurality of option screens allowing a user to modify real-time weather data input and output options including specifying the equipment and data available from a particular weather station and appearance of said predetermined screen buffers and placement of screen buffers when displayed;
  (7) provide a second plurality of option screens allowing a user to assign an input device action to a particular selection of said screen buffers; and
  (8) provide a third plurality of option screens allowing a user to modify received real-time weather data displayed in said screen buffers;
f. multiple weather stations, each comprised of
  (1) one or more weather instruments, each capable of sensing a particular weather parameter, and converting said sensed weather parameter into an analog electrical signal;
  (2) means for converting the analog signal from each said instrument into a series of digital electrical signals corresponding to the values of the sensed weather parameter over time;
g. means for communicating said digital electrical signals from said weather stations to said computer; and
h. means for transmitting said data screens incorporating current weather data received by the computer to multiple end users on a real time basis.

7. The system of claim 6, wherein said microprocessor based computer is further programmed to store historical data from some of said weather stations and display historical data in response to user input.

8. The system of claim 6, wherein said means for transmitting said data screens comprises television broadcast apparatus for non-interactive broadcast of real-time weather data under control of a weather presenter using said computer.

9. The system of claim 6, wherein said means for transmitting said data screens comprises a cable television transmitting apparatus allowing transmission of real-time weather from a particular location under selection of the viewer.

10. The system of claim 6, wherein said means for transmitting said data screens comprises a multi-user computer server allowing interactive transmission of real-time weather data from a plurality of weather stations under interactive control of a client user.

* * * * *

REEXAMINATION CERTIFICATE (3816th)
United States Patent [19]

Shelton

[11] B1 5,568,385

[45] Certificate Issued Jul. 20, 1999

[54] SOFTWARE SYSTEM FOR COLLECTING AND DISPLAYING WEATHER INFORMATION

[75] Inventor: William A. Shelton, Sparks, Nev.

[73] Assignee: The International Weather Network, Sparks, Nev.

Reexamination Request:
No. 90/004,550, Feb. 14, 1997

Reexamination Certificate for:
Patent No.: 5,568,385
Issued: Oct. 22, 1996
Appl. No.: 08/251,983
Filed: Jun. 1, 1994

[51] Int. Cl.$^6$ ................................... G06F 19/00
[52] U.S. Cl. ................................... 702/3
[58] Field of Search ................... 364/420; 702/3, 702/4; 706/931

[56] References Cited

PUBLICATIONS

Automated Weather Source, "An Overview of: Automated Weather Source (AWS) and the AWS Network", Jun. 1, 1993 date established per the declaration of Robert S. Marshall.
Campbell Scientific, Inc., "21X Micrologger", Aug. 1993.
Campbell Scientific, Inc., "PC208 Datalogger Support Software", Aug. 1993.
Solus Systems, Inc., "Solus Environmental Products", 1992.
Solus Systems, Inc., "Solus Software", 1992.
Solus Systems, Inc., "Solus Weather Net", 1992.
Solus Systems, Inc., "Solus Weather Plus", 1992.
Instruction Book for "Low Level Windshear Alert system (LLWAS) Six Sensor Improvement", Publication No. NSN 0056-00-480-0205, U.S. Dept. of Transportation, Sept. 1, 1993.
Advertising Brochure "Mobile Weather", Weather Metrics, Inc. (No Date).
Advertising Booklet "City Weather", Weather Metrics, Inc. (No Date).

*Primary Examiner*—Donald McElheny, Jr.

[57] ABSTRACT

A computer-based system for collecting and displaying weather information includes a microprocessor-based computer programmed to receive digital signals encoding weather data collected at each weather station; and to store and retrieve those digital signals in predetermined screen buffers to generate weather data screens displaying alphanumeric and graphic displays of weather data. The system further includes multiple weather stations, each comprised of one or more weather instruments, each capable of sensing a particular weather parameter and converting that parameter into a analog electrical signal, with means for converting the analog signal into a series of digital signals corresponding to the values of the weather parameter over time. The system further including means for communicating the digital signals from the weather stations to the computer and means for displaying the data screens to multiple end users in real time. Remote weather stations are connected to the computer by conventional modem/telephone hookups. Display screen data output from the computer is converted to a television broadcast quality signal so that the data screens may be broadcast or otherwise delivered to television viewers through conventional television delivery systems.

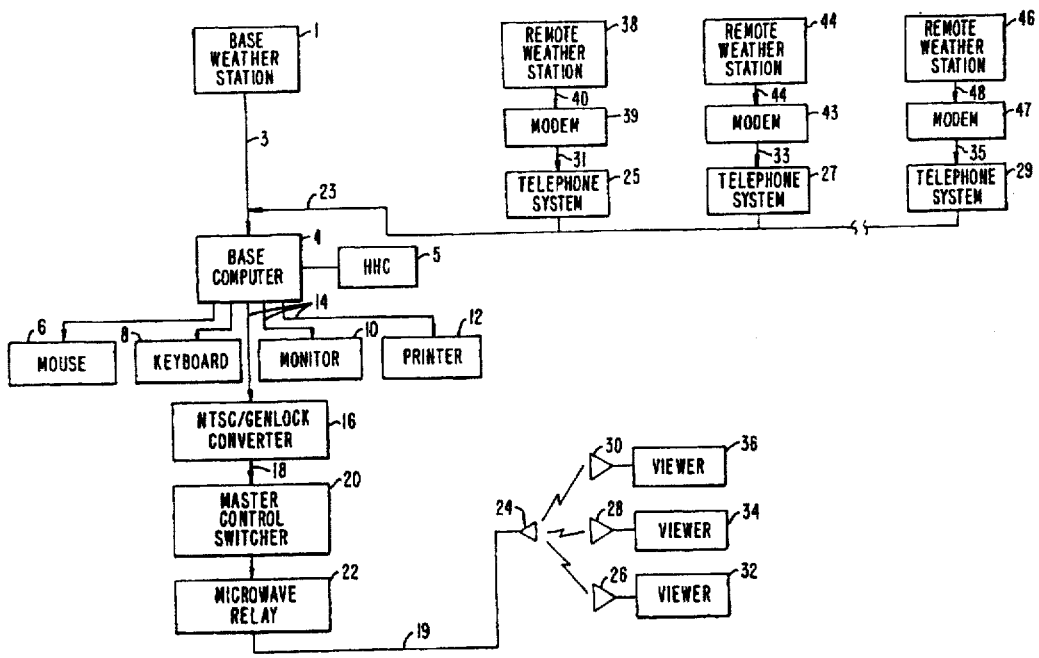

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 4 and 6 are determined to be patentable as amended.

Claims 3, 5 and 7–10, dependent on an amended claim, are determined to be patentable.

New claims 11–49 are added and determined to be patentable.

1. A computer based weather detection and reporting system for collecting and formatting real time weather data to be used in live weather presentation, comprising
   a. a microprocessor based *base* computer programmed to
      (1) *simultaneously* receive digital signals encoding real-time weather data collected at a plurality of weather stations;
      (2) store and retrieve said digital signals to and from data storage;
      (3) store and retrieve predetermined default screen configuration buffers for generating data screen[s] *buffers* displaying alphanumeric and graphic displays of real-time weather data *simultaneously from a plurality of weather stations* encoded in said digital signals;
      (4) send said digital signals *from a pluraltiy of weather stations* to said *data* screen buffers when said signals are received by said computer, so that said *data* screen buffers are prepared to display the most current *real-time* weather data received by the computer;
      (5) in response to an input device, select a plurality of said *data* screen buffers to send to a means for displaying them;
      (6) provide a first plurality of option screens allowing a user to modify real-time weather data input and output options including appearance of said predetermined default screen configuration buffers and placement of *said data* screen buffers when displayed;
      (7) provide a second plurality of option screens allowing a user to assign an input device action to a particular selection of said *data* screen buffers;
      (8) provide a third plurality of option screens allowing a user to modify received real-time weather data displayed in said *data* screen buffers;
   b. multiple weather stations, each comprised of
      (1) one or more weather instruments, each capable of sensing a particular weather parameter, and converting said sensed weather parameter into an analog electrical signal;
      (2) means for converting the analog signal from each said instruments into a series of digital electrical signals corresponding to the values of the sensed weather parameter over time;
   c. means for communicating said digital electrical signals from said weather stations to said computer; and
   d. means for transmitting said data screen *buffers* incorporating current weather data received by the computer to multiple end users on a real time basis.

2. The system of claim 1 wherein said means for communicating said digital electrical signals from said weather stations to said computer is comprised of [a] *one or more modems* coupled to the digital signal output of one or more of said weather stations, a modem coupled to the digital signal input of said computer, and a voice grade telephone system coupled between said modems.

4. The system of claim 1 wherein the means for transmitting said data screen[s] *buffers* to end users includes an NTSC/Genlock signal processor, where the computer converts said data screens into an output signal and sends said signal to said signal processor, where said signal processor converts said data screen output signal into a television broadcast quality signal, and wherein said means for transmitting said data screens to end users further includes equipment for broadcasting said broadcast quality signal to television viewers.

6. A computer based weather detection and reporting system for collecting and formatting real time weather data to be used in live weather presentation, comprising
   [e.] *a.* a microprocessor based computer running a windows type operating system capable of simultaneously displaying data from a plurality of data sources in multiple windows programmed to
      (1) receive digital signals encoding real-time weather data collected at a plurality of weather stations;
      (2) store and retrieve said digital signals to and from a plurality of locations within a data storage, each location grouping data from a particular weather station;
      (3) store and retrieve predetermined default screen configuration buffers for generating data screens displaying alphanumeric and graphic displays of real-time weather data encoded in said digital signals, with at least one separate default screen configuration buffer associated with each of said plurality of weather stations, said default screen configuration buffer specifying which data from a particular weather station is to be presented and specifying formatting parameters for said data;
      (4) send said digital signals encoding real-time weather data to said *data* screen buffers when said signals are received by said computer, so that said *data* screen buffers are prepared to display [the most current] *real-time* weather data received by the computer;
      (5) in response to an input device, select or switch between a plurality of said *data* screen buffers to send to a means for displaying them;
      (6) provide a first plurality of option screens allowing a user to modify real-time weather data input and output options including specifying the equipment and data available from a particular weather station and appearance of said predetermined screen buffers and placement of *data* screen buffers when displayed;
      (7) provide a second plurality of option screens allowing a user to assign an input device action to particular selection of said *data* screen buffers; and
      (8) provide a third plurality of option screens allowing a user to modify received real-time weather data displayed in said *data* screen buffers;

[f.] b. multiple weather stations, each comprised of
  (1) one or more weather instruments, each capable of sensing a particular weather parameter, and converting said sensed weather parameter into an analog electrical signal;
  (2) means for converting the analog signal from each said instrument into a series of digital electrical signals corresponding to the values of the sensed weather parameter over time;

[g.] c. means for communicating said digital electrical signals from said weather stations to said computer; and

[h.] d. means for transmitting said data screens incorporating current weather data received by the computer to multiple end users on a real time basis.

11. The apparatus according to claim 1 wherein said base computer is programmed with an operating system allowing weather signals to be collected and processed from a plurality of remote weather stations simultaneously with one or all or some intermediate portion of multiple files displayed simultaneously.

12. The apparatus according to claim 1 wherein each remote weather station samples and transmits data to said base computer at a rate specified by a user in a configuration file.

13. The apparatus according to claim 1 wherein a base computer logs data to archival storage from each remote weather station at a user configurable interval.

14. The apparatus according to claim 1 wherein a base computer logs data to archival storage from each remote weather station every minute.

15. The apparatus according to claim 1 wherein said base computer can accept data from eight weather stations continously and simultaneously.

16. The apparatus according to claim 1 wherein said base computer is programmed with an operating system allowing weather signals to be collected and processed from a plurality of remote weather stations simultaneously, each remote weather station's data directed to a separate data screen buffer for that remote weather station, at least one screen buffer displayed on a portion of a screen while other data screen buffers are updated in the background, ready to be called instantaneously to the foreground for viewing.

17. The apparatus according to claim 16 wherein data in a plurality of displayed screen buffer is continously updated in real-time as it is received and processed from said remote weather stations.

18. The apparatus according to claim 1 wherein data received from a weather station is displayed to screen immediately upon reception and before being logged to long-term storage.

19. The apparatus according to claim 1 further comprising a plurality of remote current conditions control screens, one screen for each connected remote weather stations, said control screens specifying formatting of real-time weather data into said data screen buffers.

20. The apparatus according to claim 19 wherein said remote current condition control screens allow a user to specify, separately for each remote weather station, automatic and manual updating of specified weather parameters, a background, a picture for a title bar, a name in the title bar.

21. The apparatus according to claim 20 further comprising a default layout control screen, said default layout control screen specifying display options for said weather data that may be overridden by said remote current conditions control screens.

22. The apparatus according to claim 1 wherein data screen buffers are loaded into RAM so that a user may switch from screen to screen rapidly.

23. The apparatus according to claim 1 further comprising a showtime/no-show option button wherein selection of a showtime option causes data screen buffers to be loaded into RAM so that a user may switch from screen to screen rapidly.

24. The apparatus according to claim 1 wherein said data screen buffers may further comprise a plurality of summary screens, said summary screens providing summary data for a plurality of sites.

25. The apparatus according to claim 1 further comprising a basic work panel displaying average weather parameters for a plurality of sites, a set of buttons allowing access to edit remote site screens, a set of buttons to allow access to a plurality of pictures stored in the system, and a set of buttons allowing access to a data screen buffer for each remote site and a plurality of summary screen buffers.

26. The apparatus according to claim 1 wherein said data screen buffers are continuously updated with real-time weather data and ready for display.

27. The apparatus according to claim 1 wherein said data screen buffers further comprise a historical screen buffer showing historical data from at least one weather station.

28. The apparatus according to claim 1 further comprising a multiple remote site configuration screen allowing a user to configure a plurality of multiple remote site screen buffers, each display selected real-time weather parameters from multiple sites.

29. The apparatus according to claim 1 further comprising a weather parameter display options configuration screen allowing a user to configure weather parameter display options such as options for displaying high and low temperatures, precipitation, pollution count, road conditions.

30. The apparatus according to claim 1 further comprising a set weather parameters screen allowing a user to input weather parameters for a weather station or other site manually when automatically collected data is inaccurate or unavailable.

31. The apparatus according to claim 1 further comprising a set pictures screen allowing a user to link an image file with a picture indication.

32. The apparatus according to claim 1 further comprising a configuration screen allowing a user to assign a keypad key to an image file.

33. The apparatus according to claim 1 further comprising a data download screen option for viewing logged raw data from a single weather station.

34. The apparatus according to claim 1 further comprising a data line configuration screen allowing a user at said base computer to configure parameters for said remote computer such as a barometer calibration adjustment.

35. The apparatus according to claim 1 wherein said input device comprises a hand held controller comprising a keypad allowing random access to said data screen buffers.

36. The apparatus according to claim 1 wherein said input device comprises a hand held controller comprising a keypad allowing instantaneous access to said data screen buffers.

37. The apparatus according to claim 16 wherein said input device comprises a hand held controller comprising a keypad allowing a user to instantaneously bring a background screen buffer to the foreground, said background screen buffer containing real-time data from a remote weather station.

38. The apparatus according to claim 16 further comprising an input device assignment screen allowing a user to assign screen buffers to input device buttons.

39. The apparatus according to claim 38 wherein said assignment screen allows a user to assign an input key to idividual site conditions at one of said remote weather stations.

40. The apparatus according to claim 38 wherein said assignment screen allows a user to assign any input key to summary site conditions from a plurality of weather stations.

41. The apparatus according to claim 38 wherein said assignment screen allows a user to assign an input key to an image file.

42. The apparatus according to claim 38 wherein said assignment screen contains a graphical representation of a keypad and a list of assignable windows and a user may assign a key to a window by dragging a button representing said key in said graphical representation and dropping it over an identifier of said window.

43. The apparatus according to claim 1 wherein said input device comprises a keypad that is in addition to and smaller than a standard keyboard attached to said base computer.

44. The apparatus according to claim 1 wherein said input device comprises a keypad connected to said remote computer via a wireless connection.

45. The apparatus according to claim 1 wherein said input device comprises a keypad connected through an I/O port said keypad being in addition to and smaller than a standard keyboard attached to said computer.

46. The apparatus according to claim 1 further comprising an input device controller screen allowing a user to set a timer response valve for said input device or to disable said input device.

47. The apparatus according to claim 1 further comprising a remote station computer, said remote station computer allowing access to data at a remote site while not disturbing the flow of data to said base computer.

48. The apparatus according to claim 1 wherein there are multiple telephone lines into any single remote weather station.

49. The apparatus according to claim 48 wherein said multiple telephone lines into a remote weather station allow the remote weather station to be accessed and download data simultaneously by a plurality of users.

* * * * *